United States Patent [19]

Graupe

[11] Patent Number: 5,920,852
[45] Date of Patent: Jul. 6, 1999

[54] LARGE MEMORY STORAGE AND RETRIEVAL (LAMSTAR) NETWORK

[75] Inventor: Daniel Graupe, Highland Park, Ill.

[73] Assignee: GraNNet Corporation, Highland Park, Ill.

[21] Appl. No.: 08/846,577

[22] Filed: Apr. 30, 1997

Related U.S. Application Data

[60] Provisional application No. 60/016,994, Apr. 30, 1996.
[51] Int. Cl.$^6$ ........................................ G06F 15/18
[52] U.S. Cl. ............................................... 706/26
[58] Field of Search ............................. 706/26, 30, 31, 706/28, 21, 20, 44, 25

[56] References Cited

U.S. PATENT DOCUMENTS

| | | | |
|---|---|---|---|
| 5,046,020 | 9/1991 | Filkin | 706/25 |
| 5,448,681 | 9/1995 | Khan | 706/25 |
| 5,461,696 | 10/1995 | Frank et al. | 706/25 |
| 5,729,662 | 3/1998 | Rozmus | 706/25 |

*Primary Examiner*—Tariq R. Hafiz
*Attorney, Agent, or Firm*—Sitrick & Sitrick

[57] ABSTRACT

A network system analyzes input words for the search and retrieval of pertinent information. The novel system then selects a module of a self organizing map (SOM) which contains the same dimension of classification as a selected input word and where neurons are interconnected horizontally (between modules) and vertically (at input and inside a module) by arrays of link weights. The system then determines what nodes or processing units within the SOM will be activated and subsequently compared to the selected input word. Feedback is utilized via a punishment/reward scheme to adjust the link weights so that the system learns the best paths and/or methods to create acceptable decisions or outputs.

55 Claims, 25 Drawing Sheets

LAMSTAR Network Diagram

General Block Diagram for LAMSTAR System

HAMMING DISTANCE

Low-hierarchy feedback from neurons.

*Structure of concepts. Physically separate modules representing concepts: names, time, places. The meaning of each concept lies in its correlation with other concepts, e.g., concept 'Mark' has a meaning if it is correlated with place (Chicago) or time (Monday).*

Stimuli of a visual system as an input word. Motion, color, and place form subwords that are processed in parallel to separate neural systems.

*Self Organized Map structure for one subword. Neurons and the weights symbolize different subwords stored in the module. Each neuron is interconnected with every other neuron in the module to form lateral inhibition (WTA). The neurons can be connected to neurons outside the module through exitory connections.*

Input word: $\underline{X}$

Subwords: $[\underline{X1}]$ $\underline{X2}$ $\underline{X3}$ $\underline{X4}$ $\underline{X5}$ $\underline{X6}$ $\underline{X7}$ Elements in subwords: $[x11, x12, x13]$ $[x21, x22, x23]$ ... $[x71, x72, x73]$ Information stored in subwords: [Time] [Physical inf] [Personal inf] [Heart/lungs] [Medicine] [Side effects] [Diagnosis]

Input word for medical diagnosis.

Probability changes for input subwords

LAMSTAR Graphical User Interface (GUI)

Menu Bar with pull-down menus.

File pull-down menu.

Open Problem Option

Open Diagnosis Option

Open Training Option

Store Option.

Quit Option.

Options menu.

Print Option.

New Catagories.

Help menu.

LAMSTAR Fundamentals

How to Use the LAMSTAR

Help Demo.

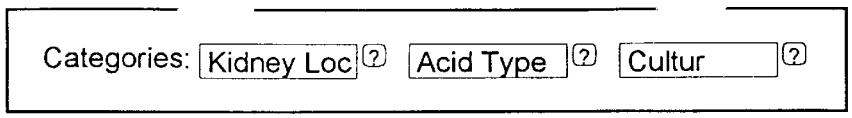
Editor Windows and Categories' Labels
FIG. 13
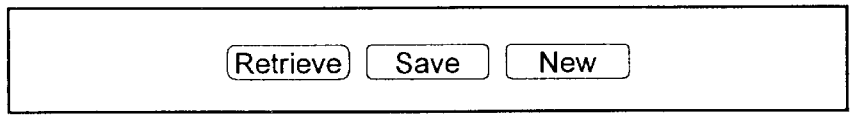
Comand Keys.
FIG. 14
| Retrieve | Save | New |
|---|---|---|
| Retrieve Key | Save Key | New Key |
| FIG. 14A | FIG. 14B | FIG. 14C |
⟨⟩
Forward/Backward Keys
FIG. 14D
Keep ?   No
Keep Key
FIG. 14E
Case ID  dat3.dat
Case ID window
FIG. 15

Diagnosis [ ] ⑦ Keep ? [y][n]

"Diagnosis" editor window.

Illustrates the display after a User invokes Help by selecting "?" adjacent to category "Location".

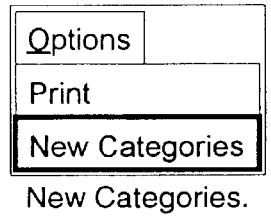
New Categories.
FIG. 18
```
By using this program you can create a new problem
or change categories in an existing problem.
CHOOSE ONE OPTION:
  n - Create a New Problem
  a - Add Categories to a Problem
  i - Add Diagnosis Information to a Problem
  d - Delete Category
  e - Exit
```
Program started by "New Categories" option
FIG. 19
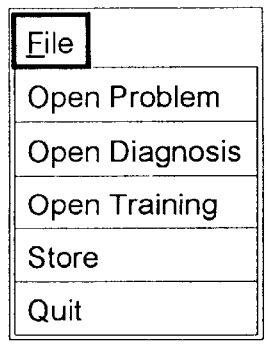
File pull-down menu.
FIG. 20

Manually inputted categories' values and categories' names

File Selection Dialog Box

Information retrieval in the LAMSTAR system.

Flow chart for diagnosis with the LAMSTAR system.

File Selection Dialog Box

A display for a successful diagnosis with
interpolation/extrapolation of the missing input data Front panel of a program started by the "New Categories" option.

Flow chart for training the LAMSTAR system.

Table 1

Information Retrieval Results

| Nr. | Input word X | SOM select | Output word W | Task evaluation |
|---|---|---|---|---|
| 1 | [0 0 0][63 145 58][0 0 0] | [SOM2:physical] | [10 20 95][64 150 60][55 8 40] | [accept] |
| 2 | [0 0 0][33 130 67][0 0 0] | [SOM2:physical] | [1 10 94][35 140 65][70 15 42] | [F1 - new correlations] |
| 3 | | [SOM2:physical] | [10 20 95][35 140 64][70 15 42] | [accept] |
| 4 | [10 20 95][0 0 0][1 10 94] | [SOM1:time] | [10 20 95][64 150 60][55 8 40] | [F1 - new correlations] |
| 5 | | [SOM1:time] | [10 20 95][35 140 65][70 15 42] | [F2 - new input subword] |
| 6 | | [SOM3:heart] | [10 20 95][35 140 65][65 12 45] | [accept] |
| 7 | [5 1 93][0 0 0][70 15 42] | [SOM3:heart] | [1 10 94][35 140 65][70 15 42] | [F1 - new correlations] |
| 8 | | [SOM3:heart] | [10 20 95][35 140 65][70 15 42] | [F1 - new correlations] |
| 9 | | [SOM3:heart] | [5 1 93][25 160 55][55 8 40] | [External: Stop search] |
| 10 | [0 0 0][35 140 65][55 8 40] | [SOM3:heart] | [10 20 95][64 150 60][55 8 40] | [F1 - new correlations] |
| 11 | | [SOM3:heart] | [5 1 93][25 160 55][55 8 40] | [F2 - new input subword] |
| 12 | | [SOM2:physical] | [1 10 94][35 140 65][65 12 45] | [F1 - new correlations] |
| 13 | | [SOM2:physical] | [10 20 95][35 140 65][70 15 42] | [F1 - new correlations] |
| 14 | | [SOM2:physical] | [10 20 95][35 140 65][65 12 42] | [accept] |

LARGE MEMORY STORAGE AND RETRIEVAL (LAMSTAR) NETWORK

RELATED APPLICATIONS

This application claims priority from provisional application Ser. No. 60/016,994 filed Apr. 30, 1996.

A portion of this disclosure of this patent document contains material which is subject to copyright protection. The copyright owner does not object to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates to large scale memory storage and retrieval networks and more particularly to a memory system that learns using selected inputs to find the closest related match then associating the match using weighted links to find corresponding memory and to output a diagnostic decision.

FIELD OF THE INVENTION

Scientists, engineers, philosophers, psychologists, medical doctors, and others have long tried to model the organization and function of the human memory.

Contemporary efforts have been progressing at a rapid rate since the 1940's and has accelerated recently with powerful computers and software available to the public. *The Handbook of Artificial Intelligence* by Cohen, Feigenbaum, Barr, and others, discusses the research of many in this field, and is incorporated herein by reference. Cohen's learning behavior models, such as the Elementary Perceiver and Memorizer and Quillian's Semantic Memory System relate that memory size can be significantly reduced by storing a word or concept only once and then associating it with a plurality of words which have supplied or learned relationships. The result is an associative network of nodes, pointers, and indexes which represent relationships between the concepts or words. Concepts or words are classified in memory according to categories also called nodes, neurons or processing units.

In *Human Associative Memory (HAM)* (1973), human long term memory models were simulated on the computer. Parsing sentences and using strategy free components of the human long term memory was the goal so as not to translate one uncomprehendable mass, the human mind, into another, the computer. The HAM model received facts or questions and used a number of memory parameters, and used linguistic theory with a match process to predict results. The ACT system was an enhancement to the HAM system because it added a short term working memory to this strategy. Instead of serially scanning the working memory, the ACT system activated the memory structure representing those segments with a higher probability of success.

The ACT system possessed continuously fluctuating activity and used non-deterministic searching. The ACT system also employed learning methods, such as designation, generalization, discrimination, and strengthening characteristics. The ACT system operated via activated nodes, limiting the travel of node activation to use control link weights between nodes.

More recently, self organizing maps (SOM's) have been used to gather and organize classifications or dimensions of words or concepts and to associate parameters input to the system. In order to provide the best understanding of the novel and powerful provisions of the present invention, some background information of conventional approaches to modeling human memory are provided below. SOM's were applied by Kohonen in Self-Organizing and Associative Memory (1984) (1988). SOM's are used to organize a class nodes or neurons having the same dimension or attribute.

Kohonen Self-Organizing Map (SOM) Layer

The Kohonen layer [Kohonen 1984, 1988] is a "Winner-take-all" (WTA) layer.

Thus, for a given input vector, only one Kohonen layer output is 1 whereas all others are 0. No training vector is required to achieve this performance. Hence, the name: Self-Organizing Map Layer (SOM-Layer).

Let the net output of a Kohonen layer neuron be denoted as $k_j$.

$$\text{Then } k_j = \sum_{i=1}^{m} w_{ij} x_i = w_j^T x; \; w_j \stackrel{\Delta}{=} [w_{1j} \ldots w_{mj}]^T \tag{Eq. 1}$$

$$x \stackrel{\Delta}{=} [x_1 \ldots x_m]^T$$

and, for the one hth (j=h) neuron where $$k_h > k_{j \neq h} \tag{Eq. 2}$$

then set $w_j$ such that:

$$k_h = \sum_{i=1}^{m} w_{ih} x_i = 1 = w_h^T x \tag{Eq. 3a}$$

and $$k_{j \neq h} = 0 \tag{Eq. 3b}$$

Grossberg Layer

The output of the Grossberg layer is the weighted output of the Kohonen layers by FIG. 8.1.

Denoting the net output of the Grossberg layer [Grossberg, 1974] as $g_j$, $$\text{then } g_j = \sum_i k_i v_{ij} = k^T v_j, \; k \stackrel{\Delta}{=} ([k_1 \ldots k_m])^T \tag{Eq. 4}$$

$$v_j \stackrel{\Delta}{=} [v_{1j} \ldots v_{mj}]^T$$

But, by the "winner-take-all" nature of the Kohonen layer; if $$\text{then } g_j = \sum_{i=1}^{m} K_i v_{ij} = K_n v_{hj} = v_{hj} \tag{Eq. 6}$$

the right-hand side equality being due to $k_h = 1$.

Training of the Kohonen Layer

The Kohonen layer acts as a classifier where all similar input vectors, namely those belonging to the same class produce a unity output in the same Kohonen neuron. Subsequently, the Grossberg layer produces the desired output for the given class as has been classified in the Kohonen layer above. In this manner, generalization is then accomplished.

Preprocessing of Kohonen Layer's Inputs

It is usually required to normalize the Kohonen layer's inputs, as follows:

$$x_i = \frac{x_i}{\sqrt{\sum_j x_j^2}} \quad (Eq. 7)$$

yield a normalized input vector x' where $$(x')^T x' = 1 = \|x'\| \quad (Eq. 8)$$

The training of the Kohonen layer now proceeds as follows:
1. Normalize the input vector x to obtain x'
2. The Kohonen layer neuron whose $$(x')^T w_h = k'_h \quad (Eq. 9)$$

is the highest, is declared the winner and its weights are adjusted to yield a unity output $k_h = 1$.

Note that:

$$k'_h = \sum_i x'_i w_{ih} = x'_1 w_{h1} + x'_2 w_{h2} + \ldots x'_m w_{hm} = (x')^T w_h \quad (Eq. 10)$$

but since $$(x')^T x' = 1$$

and by comparing Eqs. (9) and (10) we obtain that $$w_h = x' \quad (Eq. 11)$$

namely, the weight vector of the winning Kohonen neuron (the hth neuron in the Kohonen layer) equals (best approximates) the input vector. Note that there is "no teacher". We start with the winning weights to be the ones that best approximate x and then we make these weights even more similar to x, via $$w'(n+1) = w(n) + \alpha[x - w_h(n)] \quad (Eq. 12)$$

where $\alpha$ is a training weight coefficient (usually $\alpha \approx 0.7$) and it may be gradually reduced to allow large initial steps and smaller for final convergence to x.

In the case of a single input training vector, one can simple set the weight to equal the inputs in a single step.

If many training input-vectors of the same class are employed, all of which are supposed to activate the same Kohonen neuron, the weights should become the average of the input vectors $x_i$ of a given class h, as in FIG. 1A.

Since $\|w_{n+1}\|$ above is not necessarily 1, it must be normalized to 1 once derived as above.

Initializing the Weights of the Kohonen Layer

Whereas in practically all NN's the initial weights are selected to be of pseudo random low values, in the case of Kohonen networks, any pseudo random weights must be normalized if an approximation to x' is to be of any meaning. But then, even normalized random weights may be too far off from x' to have any chance for convergence at a reasonable rate. Furthermore, if there are several relatively close classes that are to be separated via Kohonen network classification, one may never get there. If, however, a given class has a wide spread of values, several Kohonen neurons may be activated for the same class. Still, the latter situation can be subsequently corrected by the Grossberg layer which will then guide certain different Kohonen layer outputs to the same overall output.

The above considerations lead to a solution that distributes the randomness of the initial weights to resemble the spread of the input vectors of a given class.

To accomplish the latter initialization strategy, one may employ the convex combination initialization method as follows:

Set all initial weight to the same value of $1/\sqrt{N}$ where N is the number of inputs (dimension of x'). Thus, all input vectors will be of unity length (as required) since $$N\left(\frac{1}{\sqrt{N}}\right)^2 = 1 \quad (Eq. 13)$$

and add a small noise ripple component to these weights. Subsequently, set all $x_i$ to satisfy $$x_i^* = \gamma x_i + (1 + \gamma)\frac{1}{\sqrt{N}} \quad (Eq. 14)$$

with $\gamma \ll 1$ initially.

As the network trains, $\gamma$ is gradually increased towards 1. Note that for $\gamma = 1; x^*_i = x_i$.

Another approach is to add noise to the input vector. But this is slower than the earlier method.

A third alternative method starts with randomized normalized weights. But during the first few training sets, all weights are adjusted, not just those of the "winning neuron". Hence, the declaration of a "winner" will be delayed by a few iterations.

However, the best conventional approach is to select a representative set of input vectors x and use these initial weights s.t. each neuron will be initialized by one vector from that set.

Interpolative Mode Layer

Whereas a Kohonen layer retains on the "winner neuron" for a given class, the Interpolative Mode layer retains a group of Kohonen neurons per a given class. The retained neurons are those having the highest inputs. The number of neurons to be retained for a given class must be predetermined.

The outputs of that group will then be normalized to unit length. All other outputs will be zero.

Training of Grossberg Layers

A major asset of the conventional Grossberg layer is the ease of its training. First, the outputs of the Grossberg layer are calculated as in other networks, namely $$g_i = \sum_j v_{ij} K_j = v_{ij} K_h = v_{ih} \quad (Eq. 15)$$

$K_j$ being the Kohonen layer outputs and $v_{ij}$ denoting the Grossberg layer weights.

Obviously, only weights from non-zero Kohonen neurons (non-zero Grossberg layer inputs) are adjusted.

Weight adjustment follows the relations often used before, namely:

$$v_{ij}(n+1) = v_{ij}(n) + \beta[T_i - v_{ij}(n)k_j] \quad (Eq. 16)$$

$T_i$ being the desired outputs, and for the n+1 iteration β being initially set to about 1 and is gradually reduced.

Hence, the weights will converge to the average value of the desired outputs to best match an input-output (x–T) pair.

The Combined Counter Propagation Network

We observe that the Grossberg layer is trained to converge the desired (T) outputs whereas the Kohonen layer is trained to converge to the average inputs. Hence, the Kohonen layer is essentially a pre-classifier to account for imperfect inputs, the Kohonen layer being unsupervised while the Grossberg layer is supervised.

If m target vectors $T_j$ (of dimension p) are simultaneously applied to m xp outputs inputs at the output side of the Grossberg layer to map Grossberg neurons then each set of p Grossberg neurons will converge to the appropriate target input given the closest x input being applied at the Kohonen layer input at the time. The term Counter-Propagation (CP) is due to this application of input and target at each end of the network, respectively.

With this detailed recitation of prior art methods, we note that the development of software capable of learning has also progressed rapidly in the 80's and 90's. *Learning Logic* by Parker (1982) is hereby incorporated herein by reference.

Other recent developments have come in winner take all networks for competitive learning. An article by Kaski and Kohonen, *Winner-Take-All Networks for Phvsiological Models of Competitive Learning*, is herein incorporated by reference.

In Minsky (1991 and 1969), computations are determined by the connections between neurons. The training algorithms are based on concepts of Hebbian learning. (Hebb 1961). These sources are incorporated by reference. In Hebbian learning interconnection weights vary in accordance with the product of excitation levels of the source and destination neurons. Martin (1988) introduced reconstruction of information based on interpolation and extrapolation using address correlation. Organizing words with close similarities and recreating a states similar to the original.

It is conclusive that the long felt need for a large yet efficient and flexible memory system which will produce associations has incomprehensible significance in today's society.

In the late 90's, programming schemes in the public domain rapidly developed with public ownership of sophisticated computers a reality. In the large scale memory development area there is a high level of skill in the art. Many giant computer companies and universities are intensely working on this area of technology. The current level of statistical decision tools, however, lacks coordination and user friendly functionality. Software for large memory organization is not readily available. Therefore, there is also a long felt need for a computer system which will efficiently store and retrieve large quantities of associated data very rapidly at low cost.

Moreover, the prior art systems lack error tolerance for input data. Failure to input precise data in conventional systems result in an input that is uncomprehendable to the computer. Generalization capability is also poorly developed in conventional systems. Also, the prior art cannot locate a subject's winning comparison and it's associations based solely on similarity to stored data.

Prior art systems also lack thoughtful channeling weights needed to determine the order of exciting the processing units or neurons. Such defects create a significant number of undesirable "compares", correspondingly slowing the entire system. Therefore, the prior art systems search the whole memory or at least the whole group within a SOM module of interest. This processing severely degrades performance and efficiency.

Due to these search selection methods and the associated required review of the acceptability for output, prior art systems cannot find an acceptable match in a high percentage of examples.

Prior art requires huge memories a their data base increases in real-world diagnostic or retrieval problems, such as in medical diagnosis problems. They do not allow for forgetting and for re-generation of forgotten memory through correlations, extrapolation, and interpolation.

Also, the prior art systems do not use interpolation and or extrapolation techniques to fill in for incomplete data, nor do they further interrogate a user to supply additional needed data which usually is critical to the outcome.

Testing is something that an experienced operator would perform. However, conventional methodologies in this technology do not perform this critical task.

Therefore, it is an object of the present invention to not be limited to any specific storage retrieval task, but to be flexible in design so that the invention may be used for numerous tasks ranging from, for example, literature searches of titles in a library network to medical diagnosis search, industrial fault diagnosis, and retrieval of information on the Internet and to any of myriad storage and retrieval tasks.

It is a further object of the invention to provide rapid direct feedback at any search level and to provide a novel statistical decision feature in the retrieval system so that the search does not get stuck by dogmatism.

Above all, through the incorporation of forgetting, short and long term memory, extrapolation and interpolation, it can use finite memory for infinitely growing memory situations.

Another object of the invention is allow the memory search to wander while controlling the search with a set of priorities and interrupts using cost evaluation and control.

SUMMARY OF THE INVENTION

To alleviate the problems as above in the prior art, the present invention utilizes the diverse research and experience of the fields of psychiatry, psychology, medicine, statistics, computers, and software among others. The present invention provides, among other things, a novel and powerful method and system for the fast retrieval of pertinent output data or results by utilizing a plurality of input parameters, data, sensors and/or characteristics using interacting subsystems. The present invention accomplishes these tasks by employing both correlation based structure for information storage and retrieval, and simple stochastic search capabilities with generalization capabilities and robust fault tolerance as revealed hereinbelow.

A preferred embodiment of the present invention analyzes all input words to select a word. The selected word is determined to be a good starting point for the search and retrieval of pertinent information. The novel method then selects a module of a self organizing map (SOM) which contains the same dimension of classification as the selected input word and where neurons are interconnected horizontally (between modules) and vertically (at input and inside a module) by arrays of link weights. The method then determines what nodes or processing units within the SOM will be activated and subsequently compared to the selected input word. The decisions are made by a task evaluator which is not allowed to become rigid in its execution. A stochastic modulator encourages pseudo random selections to be made by the task evaluator at defined times and to modulate link weights to avoid network rigidity. The task evaluator also receives input from all parts of the novel system. This feedback is utilized via a punishment/reward scheme to adjust the link weights so that the system learns the best paths and/or methods to create acceptable decisions or outputs. When an acceptable match is found by correlation comparators within a predefined finite section of the selected SOM module (not necessarily from the whole SOM module), a process of neuron or processing unit association begins. The links between processing units and other processing units have weights which increase with success and decay with defeat and time. The links associate different dimensions of phenomena or different classes of processing units. They can also link to different words within the same classification.

In one embodiment of the present invention, additional input words are processed after the initially selected word. In another embodiment, if the task evaluator determines that additional input is needed to aid an evaluation, the evaluator supplies it and informs the user what assumptions have been made. Alternatively, an embodiment requests additional information from the user.

These and other attributes of the present invention will be discussed with reference to the following drawings and accompanying specification.

BRIEF DESCRIPTION OF THE DRAWINGS

FIGS. 13, 14, 14A, 14B, 14C, 14D, 14E, 15, 16, 17, 18, 19, 20, 21, 22 and 23 show various option keys and menus directed to the embodiment of FIG. 10;

and

Figure 10:
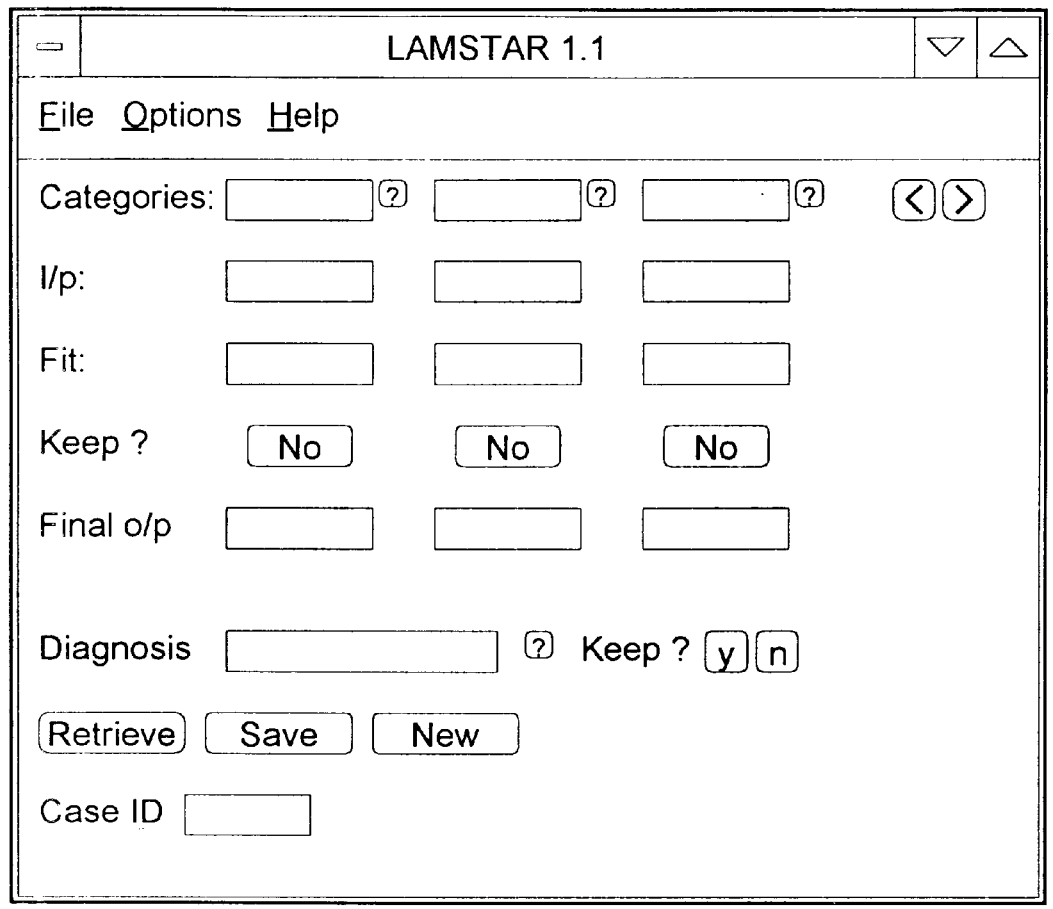
FIG. 10 shows a LAMSTAR Graphical User Interface in accordance with an application program embodiment of the invention.
Figure 28:
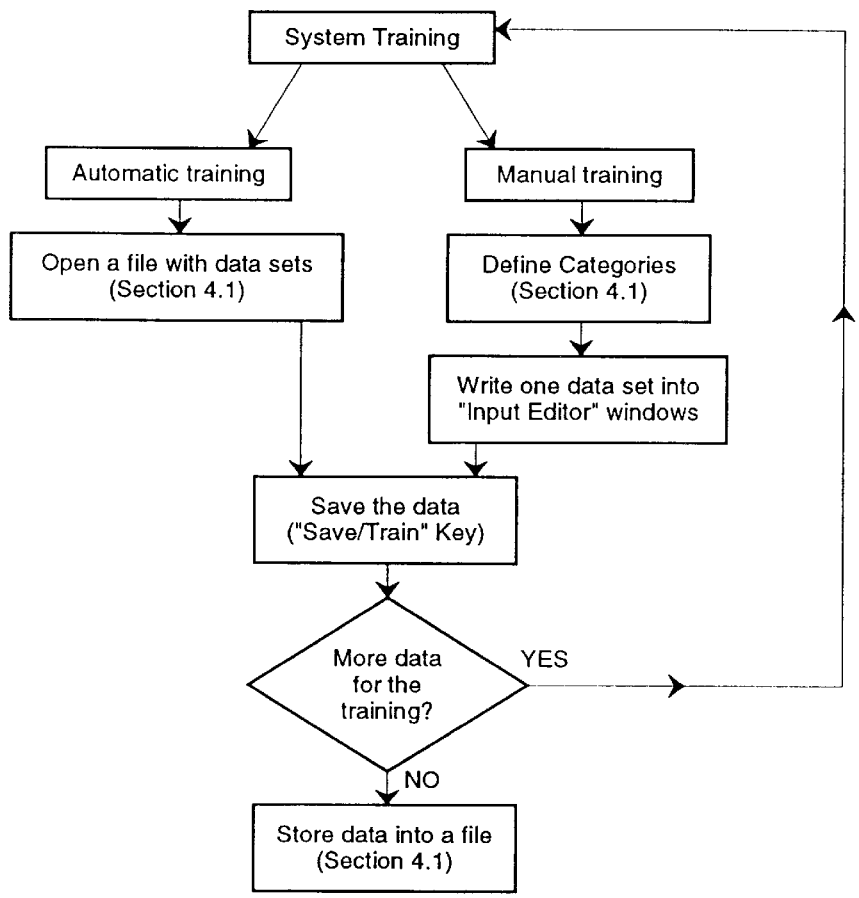

FIG. 28 shows a flow chart for training the embodiment of FIG. 10.

DETAILED DESCRIPTION OF THE PREFERRED EMBODIMENT

The invention is directed to a neural-network based system designed for very fast retrieval of data from a very large memory base. The system requires minimal computer skills. It is designed for use by a physician, nurse, car mechanic, maintenance person, and anyone familiar with the basics of computer interfacing. The only tool required in the simplest application is a personal computer or any other computer. Although adaptable to any computer system, the preferred embodiment utilizes a IBM compatible with an Intel 80286 or faster microprocessor.

The neural network discussed below in accordance with the present invention is an artificial neural network for the large scale memory storage and retrieval of information.

This network attempts to imitate, in a gross manner, processes of the human central nervous system (CNS), concerning storage and retrieval of patterns, impressions, and sensed observations, including processes of forgetting and of recall. It attempts to achieve this without contradicting findings from physiological and psychological observations, at least in an input/output manner. Furthermore, the LAMSTAR (LArge Memory STorage And Retrieval) embodiment of the invention attempts to do so in a computationally efficient manner, using SOM (Self Organizing Map)-based network modules, combined with statistical decision tools. The LAMSTAR network is therefore not a specific network, but a system of networks for storage, recognition, comparison, and decision that in combination allow such storage and retrieval to be accomplished.

The invention is not intended for any specific storage-retrieval tasks, through it can be employed for numerous such specific tasks, ranging from literature-search of titles in a library network, medical diagnosis, fault detection, search and retrieval of information in the Internet, etc. This discovery was guided by trying to find a mechanistic neural network-based model for very general storage and retrieval processes that are involved in, say observing a (face of a) person and trying to recall if and where we have met that person before, possibly many years ago, then retrieving that early memory and recalling that (correlated) memory too, which may be a memory of another person, or a place or an event so correlated. The LAMSTAR's statistical decision feature allows it not to get struck by dogmatism to avoid dogmatism, and to allow it to wander along at random, as do processes in the human CNS. Furthermore, it has a set of priorities to control its search, retrieval, and wandering, to interrupt and to give priorities to commands related to danger or life-threatening situations (say, in medical diagnostics, and of course, in the human CNS).

The LAMSTAR network of the invention thus provides:

(1) A robust and efficient large scale memory storage and retrieval model, based on a link-weight structure, to allow fast search and retrieval, to consider forgetting and recall, using a stochastic (probabilistic) modulation scheme and incorporating forgetting, correlation, interpolation, and interpolation algorithms.

(2) An efficient model for representation of inputs through simple coded vectors.

(3) An efficient response to the input impression- (observation-) codes, this response being guided by memory, priorities, and consequent interrupts. Here we are guided by psychological experiments that show that what we perceive is not the true sensory signal but a rational reconstruction of what the signal should be. Hence, the retrieval process and correlation with various memories will serve to decide how an observed input is interpreted, which may or may not be its "correct" interpretation but still is the perceived one.

General Principles

In general, there are two levels at which the CNS storage/retrieval problem can be modeled. The first is based on the bottoms-up processing approach, starting with a network of simple processing units (neurons). Here computations are determined by the connections between the neurons. The training algorithms used in that case are usually based on concepts of Hebbian learning where interconnection weights vary in accordance with the product of the excitation levels of the source and the destination neurons.

The second approach is based on neurophysiological observations that many parts of the CNS are involved in the reconstruction of information. This general approach is related to the idea that the brain consists of many agents and a knowledge line (K-line) is created whenever we want to memorize some experience. The K-line is connected to mental agents that are involved in the memorization process. When the K-line is subsequently activated, it reactivates some of these mental agents to recreate a mental state similar to the observed original. The LAMSTAR network below employs this general philosophy of linkages between a large number of physically separate modules that represent concepts, such as time, location, patterns, sounds, words, events, emotions, etc., in an explicit algorithmic network.

An Outline of the LAMSTAR Network of the Invention

Basic Structural Elements

Figure 1:
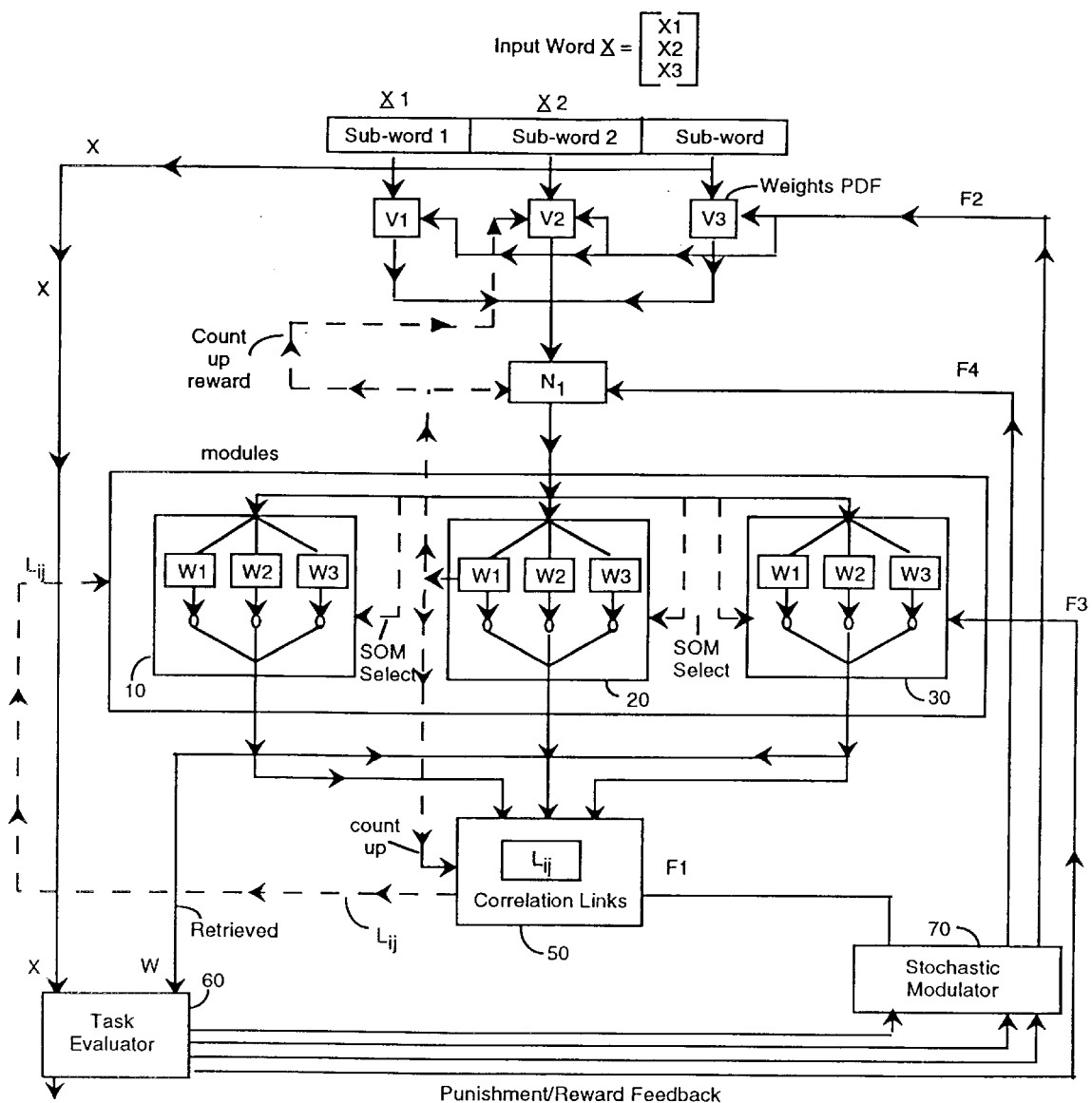
FIG. 1 shows a general block diagram of the LAMSTAR system of the invention.
Figure 1A:
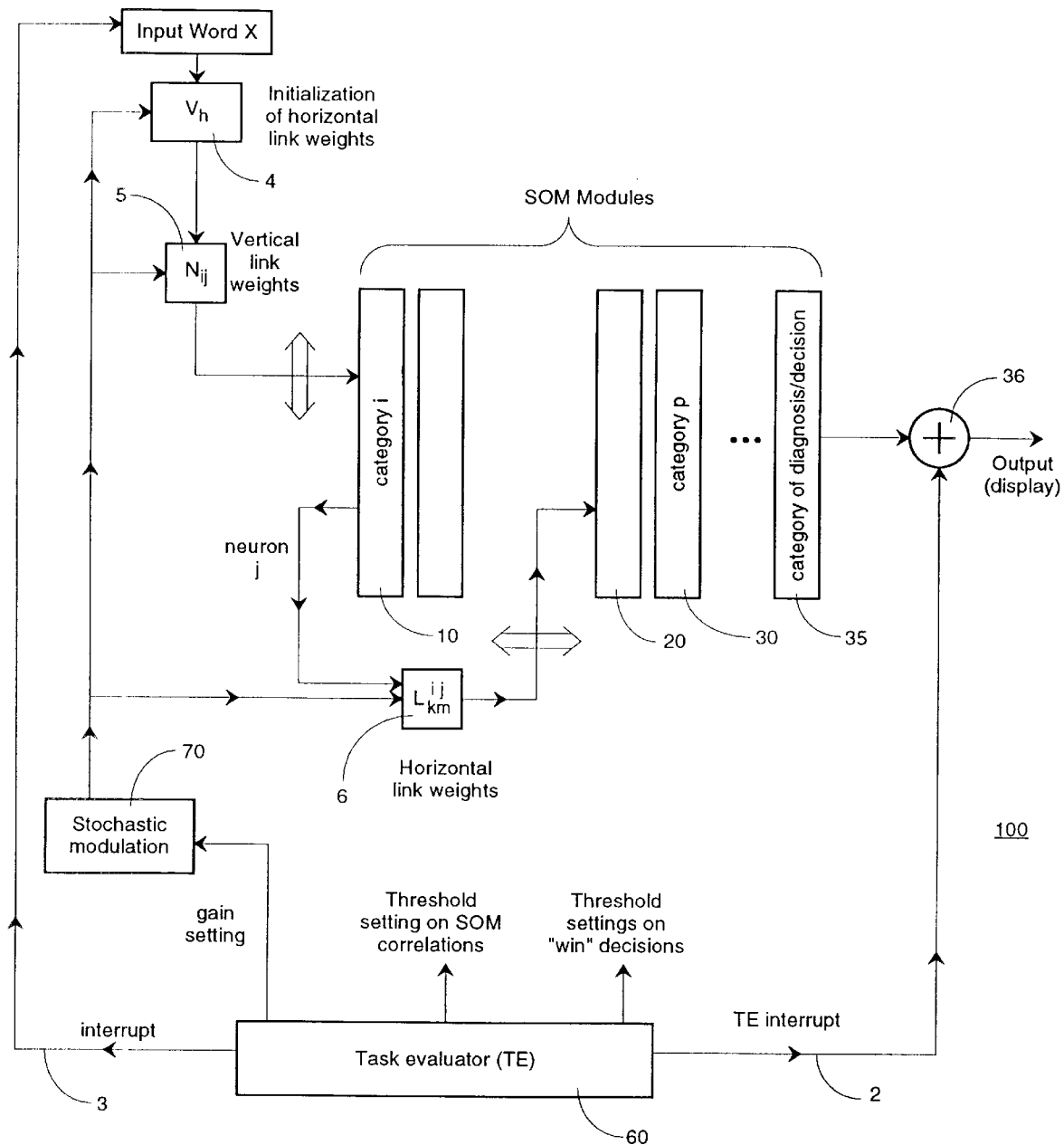
FIG. 1A shows an alternative general block diagram of the present invention.
Figure 1B:
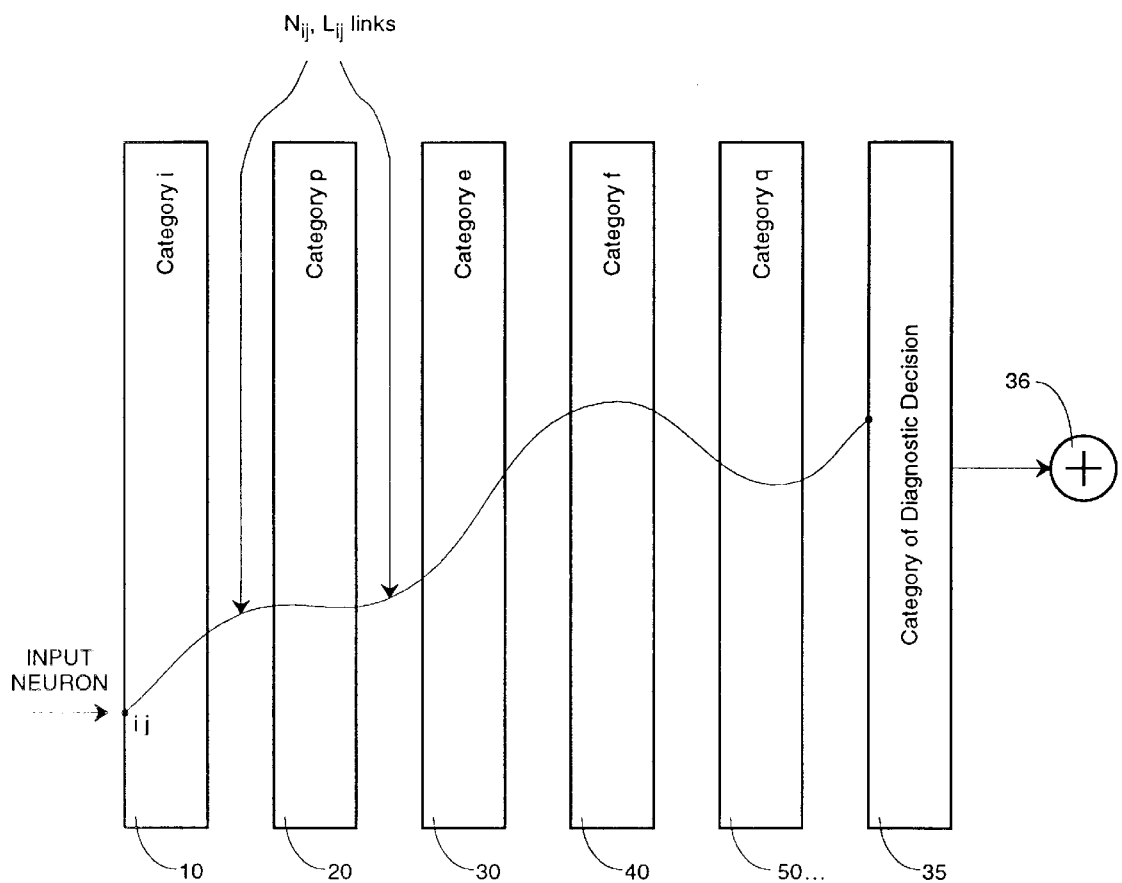
FIG. 1B shows the propagation of an input neuron through the SOM modules via the link weights of the present invention.
Figure 3A:
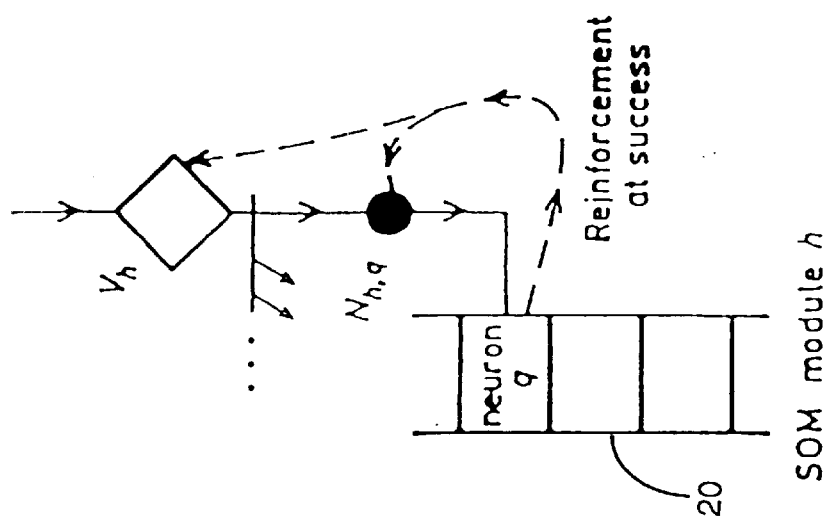
FIG. 3A illustrates the low hierarchy feedback from neurons within SOM modules of the invention.
Figure 3A:
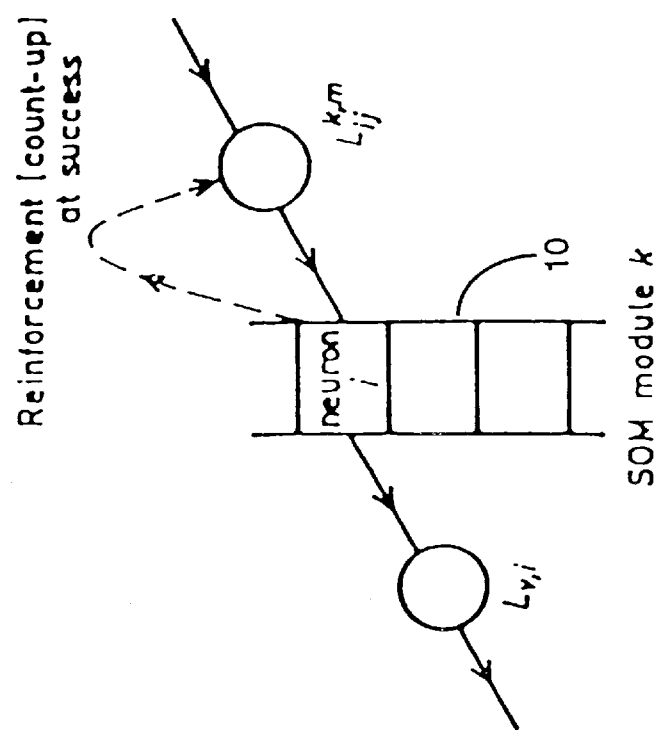
Figure 3B:
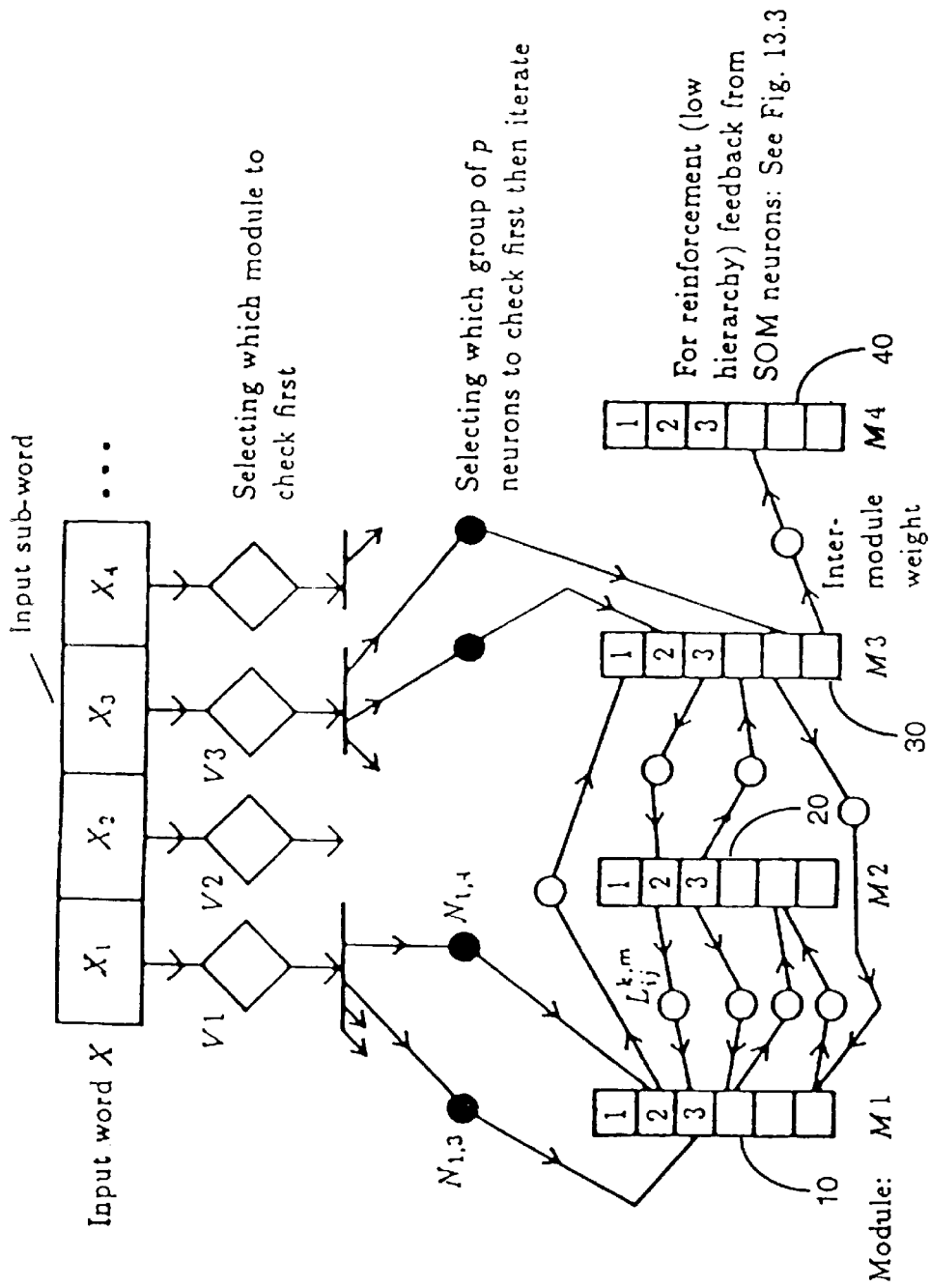
FIG. 3B illustrates the correlation relationships of link weight values stored in the correlative link memory to the input word and the result selection process, from the input word X selection of one of the input subwords, to selecting which SOM module according to the vertical link weights, to selecting particular memory cells (neurons) within the selected SOM module to check first and then iterate, and for selecting between memory cells and between SOM modules, and further illustrates the reinforcement (adjustment means) based on feedback of the results (success or failure) of winning matches, to adaptively vary the stored link weight values based on learning (experience).

The basic processing modules of the LAMSTAR system are somewhat modified Kohonen SOM (Self-Organizing Map) modules FIGS. 1, 1A 10, 20, 30 where modification is mainly due to the fact that in the LAMSTAR, only a limited predetermined part of each SOM module is being processed at a given time. The LAMSTAR system 100 assumes that the input scenes/patterns/concepts given are adequately coded prior to entering the system. The system 100 (network) is thus organized to find a neural cell (neuron) in a set of neurons ((p) FIGS. 3A–3B (j) FIG. 1A) of a class (namely, in one SOM module 10, 20, 30) that best matches (correlates) with the input pattern X (word) and correspondingly categorize 35 the winning match for eventual display 36 (FIGS. 1A, 1B). Say, for an input that denotes a name of a person, the network 100 will search for a neuron within a class of neurons (p) that stores names of persons which best matches the inputed name. The SOM configuration is chosen since it can yield very rapid matching, and it can do so with good error tolerance and because of its generalization capability. We observe that the number of neurons (p) (j) in one SOM module 10, 20, 30 can be huge if there are many patterns of a given class to be considered (FIG. 1). Hence, for cases of large scale memory storage/retrieval as considered in the LAMSTAR, only a finite group of neurons in any SOM module will be searched, and not the whole module (FIGS. 3A and 3B). Furthermore, in contrast to the classical SOM designs, a reward feedback will go from any SOM neuron that was successfully retrieved, to reward (to count-up) the weights of the links leading into that neuron. See FIG. 3. Furthermore, neurons in each SOM module are erased if unused for a given time interval, this being denoted as a forgetting feature to limit the size of each module.

A coordinated activation of neurons in various modules allows the network 100 to recreate (interpolate) complex patterns and to make associations (say, to associate a person's name with face, with address, etc.). The computations that are involved follow connection between neurons in a SOM and also between a large number of SOM modules.

See FIGS. 1, 1A, 2, and 3. The structure of FIGS. 1, 1A facilitates much easier integration of modules than via symbolic search systems.

Key elements in the LAMSTAR network of the present invention that are fundamental to its operation are arrays of link-weights that zig-zag the network horizontally and vertically (see FIGS. 1A, 1B and 2) and a network of feedback rewards and punishments emanating directly from neurons to the respective input-side links leading to them. This neural-level feedback is complemented with higher hierarchy feedback from a task-evaluation layer. Also, stochastic modulation is incorporated throughout, to avoid rigidity. Time correlations, stochastic link-weights and forgetting features.

The weights for the links between SOM modules 10, 20, 30 (FIG. 1) (namely, the correlation links L 50 in FIG. 1, (5) (6) in FIG. 1A, are established on the basis of statistical correlations between the various concepts/words/patterns W1, W2, W3 that are considered (stored or to be stored)). Link weights 5, 6, 50 decay over time when not recalled (used) for a length of time, this being a forgetting feature of the network.

The "words" (say, patterns) are associated time-wise if they occur more-or-less at the same time at a rate above some threshold rate-value that is considered as a time decay threshold, thus establishing time-correlations. The words W1–W3 considered are all multi-dimensional, time being only one of these dimensions (the others being dimensions to classify the word's meaning, say its denoting a name, a face, a place, an emotion, color, size, etc.). Hence the multi-dimensional form is an information-content coordinate form (with each dimension employing one SOM module 10, 20, 30). Time correlation has a priority in the correlation search. Hence, in the retrieval process, the invention will first search for a time-correlation, and then it will branch away accordingly. The number of neurons in a SOM module (as in FIG. 1) corresponds to the number of different subwords X1–X3 of a class that can be stored.

Channeling weights for fast retrieval

The retrieval phase of the LAMSTAR invention selects subwords X1–X3 of an input "word" ((X) FIGS. 1, 1A and 3A, 3B), one at a time, and examines correlations with stored subwords of a given class (dimension) of subwords, say, names of persons. The channeling of the search that determines the order of exciting the neurons within a finite section of predetermined length (number of neurons) in a given SOM module 10, 20, 30 is first determined by count-up/forgetting feedback from the concerned neurons as in FIGS. 3, 3A and 3B and 4, subject to priorities determined by the task evaluation unit 60 of FIG. 1.

These reward/punishments/priorities determine the mean of a probability distribution function (pdf) applied to pseudo white noise to modulate the deterministic setting which serves as the mean of that distribution. The latter provides stochastic modulation to finally set the weights $N_{ij}$, $L_i$, and $V_n$ (see FIGS. 1, 1A and 3A, 3B). It is important to observe that not all neurons of a SOM module 10, 20, 30 are examined, but only a finite set (of p neurons), starting with the neighborhood of top priority ones as determined by the weights ($N_i$) of FIG. 1, (5) (6) of FIG. 1A. A stop (interrupt 3) is instituted by the task evaluation subsystem 60 of FIGS. 1, 1A once an adequate match is achieved or as otherwise determined by the SOM correlation algorithm discussed below. The interruption of search before all or even most SOM neurons of a given SOM module 10, 20, 30 have been checked (correlated), is fundamental to the LAMSTAR invention, since it must rapidly deal with huge memories. It therefore cannot afford the time to search all memories. The direct feedback from activated neurons and the short-cut of interruption when determination of adequacy is made (according to error tolerance values and priorities set by the task evaluation unit), give the invention its much required speed, for large scale memory applications.

The SOM correlation process is that of determining SOM neuron output $K_j$ given weights $W_{ij}$ at m inputs (m being the subword lengths), such that $$K_j = \sum_{i=1}^{m} w_{ij} x_i = w_j^T x \qquad \text{(Eq. 17)}$$

x being the input subword and $w_j$ being the jth memory.

The SOM correlations, links, and wandering searches

The winning output of the SOM module 10, 20, 30 that has been reached by the above feedback process and the subsequent stochastic modulation will activate all the nodes associated with it in other SOM modules. Consequently, a single concept subword X1–X3 automatically results in connecting to associated subwords with the highest $L_{ij}$ link-weights. The resulting retrieval is subsequently (again) checked at the SOM level concerning correlations between stored subwords and input subwords. The links are then reinforced in cases of successful retrieval to "strengthen" the weights of such links.

Therefore, if for a given SOM module 10, 20, 30, a winning neuron has been determined (for its corresponding input-subword), then first the highest L-valued links to subwords relating to another dimension of the input word (and which are or may be stored in another SOM module) are being examined by correlations as in Eq. 17. The final full word retrieval must however await an adequate approval of the task evaluation unit 60 only after each subword of that input word has been accepted (approved) at the SOM-correlation level. See FIGS. 1A, 1B.

Furthermore, once a retrieval has been completed, as determined (and outputted) by the task evaluation unit 60, and if no new input or interrupt exists, the task evaluator 60 can instruct moving to another memory (say name-of-person, once one name-of-person has been retrieved (FIG. 5)) that shows high correlation link (address correlation in the terminology of L of FIG. 1 with the first name, say, either through the time subword or a space subword, etc.

A similar stochastic adjustment is applied to the weight $V_i$ of FIG. 1 that serve to select which SOM module 10, 20, 30 first receives (processes) a subword X1–X3 of any new input word X. Here initially the choice is totally (pseudo-) random. However, since the decision on which of the input's features should be first examined greatly influences the speed of search, improved skill in that choice of this order is being "learnt" by the LAMSTAR invention. This learning process (namely, biasing the pseudo-random distribution of selecting the first module, noting the other modules are determined by the strengths of the inter-module links $L_j$) is determined again by feedback from winning neurons (see FIGS. 3A–3B) subject to priorities set by the task evaluator 60. Then neuronal feedback memorizes (counts) the relative number of iterations needed for a successful search per each module that has been chosen as a first for any new input word. Stochasticity again serves to avoid rigidity. Hence, if words of a given class often belong to a task, say of medical diagnosis in case of a cardiovascular problem, then the system will tend to look for a subword or cardiovascular status and not on, say, the patient's accent. If the input-word population changes, the key subword will then change. Obviously, if a subword belonging to a given category does not appear, despite its learned high success rate, then the task evaluation will look for the next successful subword.

Short term memory and forgetting

Short term memory (STM) is incorporated in the SOM structure of the invention such that after a pattern-word has been removed, the outputs of the winning neurons do not go immediately back to zero. Their activity (non-zero output) drops only gradually. This STM feature allows the network to rapidly re-retrieve very recent information.

Figure 4:
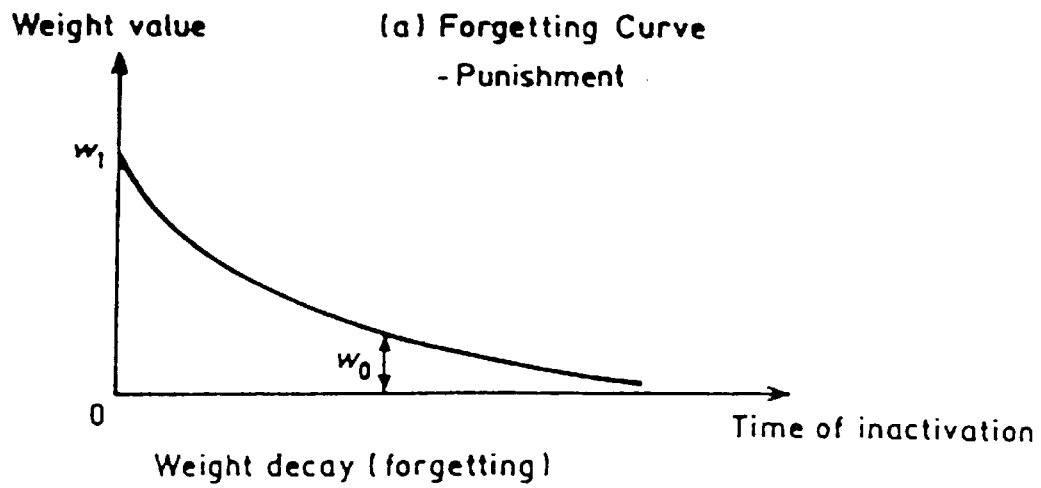
FIG. 4 illustrates the punishment/reward awaiting curves.
Figure 4:
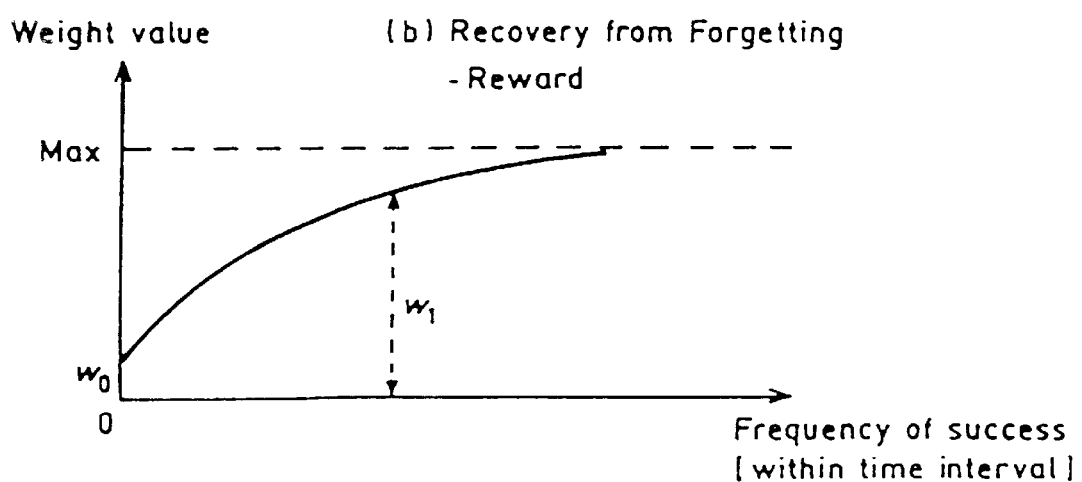

A major mechanism to facilitate short term memory is due to (prior to stochastic modulation) forgetting curves that are built-in into all link-weights, as in FIG. 4. Forgetting is, in fact, an inhibition mechanism at the link-weight level.

Up-down counting, interpolation and extrapolation

The LAMSTAR invention rewards re-observation of earlier observed (earlier stored) information. Such rewards are in terms of up-down counting (up for repeated observation, down in down-count decay or forgetting when long time elapses with no re-observation as in FIG. 4), to update the weights of FIG. 1, and to speed up the search process. The forgetting curves of FIG.4 illustrate recovery from forgetting via up-counting rewards to link weights.

Another important element to speed-up the search, as is necessary in large scale memory storage and retrieval, is extrapolation/interpolation. Speed is of utmost and obvious importance in biological storage/retrieval noting the very slow cycle time and transfer speeds—of order of a few meters per second—the biological brain, as compared to close to speed of light—300,000,000 meters per second in electronic circuits. Hence extrapolation/interpolation is virtually a necessity there. This is provided in the novel LAMSTAR network through the $L_{ij}$ links (see FIGS. 1 and 2) that facilitate convenient extrapolation and interpolation to previously related subwords that were missed or mistaken (given) input word. Re-observation also serves to improve previous extrapolation/interpolation relations through the count-up rewards of $L_{ij}$ links. Interpolation is thus an on-line reconstruction of words from previously stored data in SOM modules. The reconstructed stored input and the observed input are compared and the difference is evaluated by the task evaluation section 60 as in FIGS. 1, 1A to determine a fit between the interpolation/extrapolation of previously stored and new information. Acceptance and rejection are stochastic and not deterministic, to avoid deterministic dogmatism. If the stochastic modulation 70 results is one of rejection of a fit, then another set of correlated earlier-stored words is tested. An increase in the acceptance probability is equivalent to lowering of a decision threshold. When all stored sets of correlated memories have been tried, the probability weights are modified and the next subword of the (same) input word is examined.

Feedforward/feedback Structure

Whereas the SOM networks are feedforward networks, the LAMSTAR architecture also employs feedback learning. As shown in FIGS. 1, 1A, SOM is indeed feedforward, with internal weight adjustments in proportion to the differences between their values and the inputs that are being applied. Feedback takes place in the punishment/reward process applied to the various weight (5, 6) of the links directly from successfully retrieved SOM neurons (low hierarchy feedback, as in FIG. 3A) subsequently an upper hierarchy feedback level, exists at task evaluation unit 60, as in FIGS. 1, 1A, 3A, and 3B.

The invention is a self-organizing network. It requires sample or working inputs for initial set up but it can learn new relations and totally new inputs. Furthermore, even the initialization inputs 4 are treated exactly as any other input. Obviously, until enough (Y) words have been stored in any SOM module 10, 20, 30, all neurons of that module are examined in one iteration.

Task evaluation and prioritization

The task evaluation system 60 serves as an overall highest hierarchy controller of the LAMSTAR system 100. First, it gives priority in link value to searching neurons (memories) that are most important, say, regarding danger or life-threatening situations (in medical diagnosis applications, as in Case Study A below). Second, it determines via threshold values when correlations via Eq. 17 are high enough. Also, in cases where no winner is determined after so many iterative search-steps, it may decide to interrupt (3) search and lower its threshold to allow declaring the best fit thus far as 'winner' or to give up the search and declare a new memory. Finally, it may otherwise interrupt search (2) due to external inputs to the task evaluation unit, and it outputs retrieval results to the outside world".

The task evaluation unit 60 thus serves as a general interrupt controller and as a controller to set the weight $N_{ij}$, $V_j$, $L_{sr}$ of FIGS. 1, 1A by receiving and acting on performance data from the appropriate parts of the network 100 in a feedback manner.

Information Representation and Storage

Biological Models

The biological Central Nervous System (CNS) differs from conventional computing machines in two major aspects. Firstly, as mentioned earlier, it is very much slower in its cycle times and transportation time, the latter being 1.5 to 5 m/sec as compared with speeds on the order of light speed in electronic computers. Second, the CNS is able to generalize and to learn from experience well beyond any man-made machine.

Despite the enormous slowness of the CNS that results in elementary computational cycles of a few milliseconds, the biological CNS takes only a few tens of milliseconds to recognize and comprehend images and patterns. This translates into about 100 sequential steps per such recognition in contrast to millions of steps for a conventional computer. The massive parallelism and interconnectivity of the CNS is only part of the answer to this puzzle. Efficient organization, programming methodology and coding appear to account for much of the rest. This is also apparent in the brain's ability to detect minute differences on one hand and to filter noise and distortions on the other hand. Furthermore, whereas ordinary computers require uncompromising programming precision, the CNS can generalize and is of robust structure. All these aspects are behind the interest in neural networks. They all affect greatly the present neural network for large-scale memory storage and retrieval, where efficiency is so crucial for fast storage and retrieval.

We have outlined the methodology we adopt in the novel LAMSTAR system in our attempt to achieve a high degree of efficiency and thus to explore possible algorithms for that purpose which at least do not contradict, in input/output or input/outcome, observations of the CNS, including non-dogmatism, forgetting, extrapolation and interpolation. All these, however, require a representation or coding of the observed (sensed) input information that allows the employment of such algorithms.

Figure 5:
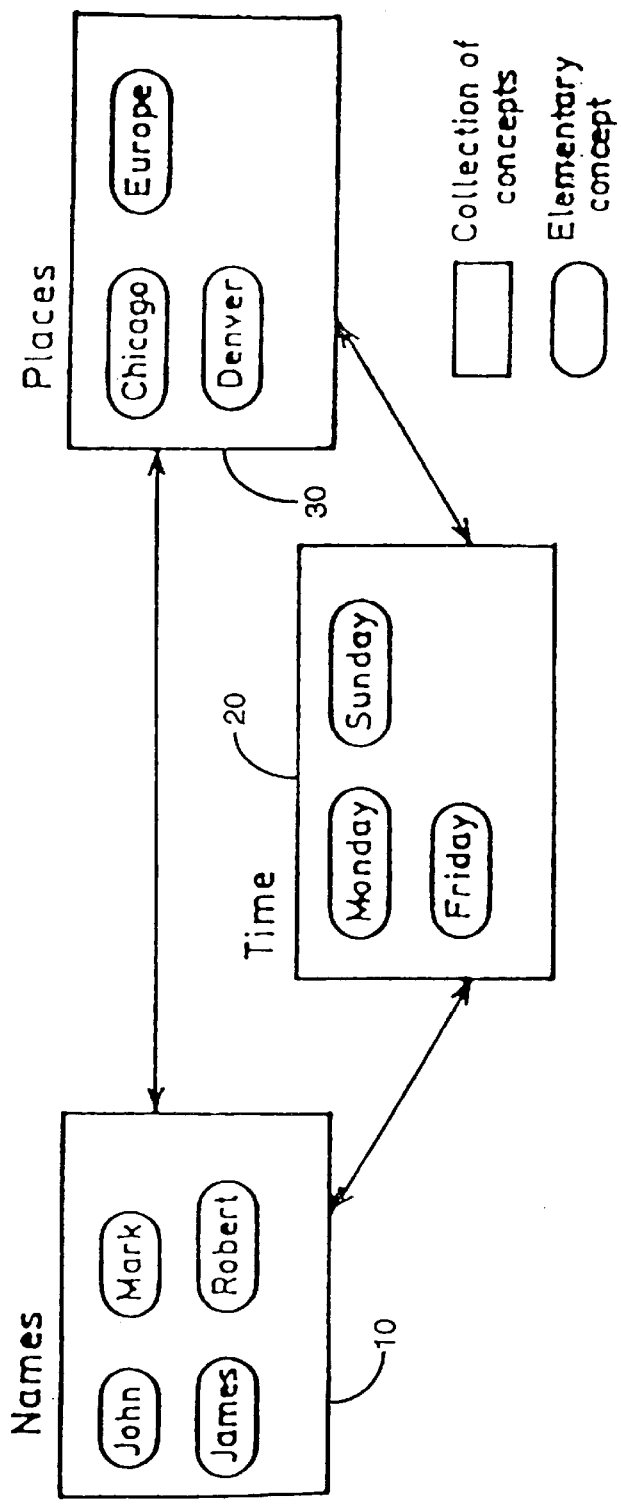
FIG. 5 shows the structure of concepts relating to the SOM modules of the invention.

The representation to be employed must account for the basic dimensions of the input word, as discussed earlier, namely, time, location, meaning, name, shape, color, sound, smell, events, emotions, etc. and also how they interrelate. The resulting novel input representation structure is shown in FIG. 5. The entire knowledge contained in this structure is then to be captured via the collection of relations among primitive concepts or dimensions (sub-words) of the input word via the LAMSTAR network system of FIGS. 1, 1A and 1B. The meaning of each primitive concept (sub-word) lies in how it interconnects with other elements (primitive concepts). Alone it has no meaning.

Retrieval requires representation, as does any learning. Representation of information storage and its modeling are inseparable concepts. Research has shown through simple neuron recordings that units in the sensory areas of the CNS respond best to a relatively small placement of stimuli. This supports the view that a unique neuron is dedicated to each concept—the "grandmother cell theory". Temporal correlations among physically separate cortical regions exist relative to a single stimulus. This supports a correlation-based structure of information storage and retrieval in the CNS. A stimulus to one site in the brain was found to create activation patterns in different cortical regions. One part (dimension, subword, SOM module) of an input word, when activated, causes retrieval-activation in all related (linked by L-links as in FIGS. 1, 1A) SOM modules (dimensions, subwords) of all related concepts, including time related inputs.

The LAMSTAR representation approach

As stated, the LAMSTAR is based to a great extent on a grandmother-cell theory for encoding each concept. This allows changing, modifying or even erasing (forgetting) a single stored concept (subword) without disrupting other concepts. Each concept is stored in one neuron. Each class of concepts (category, dimension) occupies one SOM module while each input to an individual neuron represents one bit of a subword. Memory is in terms of SOM weights.

Retrieval is guided by connection link-weights $L_{ij}$, $N_{ik}$, $V_i$ as in FIGS. 1, 1A, 1B, 2, and 3A and 3B. Still, since a word is actually divided into subwords, each of which being stored separately, the LAMSTAR is, to some extent, a compromise between the holographic distributed memory and the grandmother-cell memory as discussed above. The LAMSTAR compromise structure thus possesses the essential attributes of artificial neural networks, namely, generalization and fault-tolerance.

Input Word Coding

Figure 6:
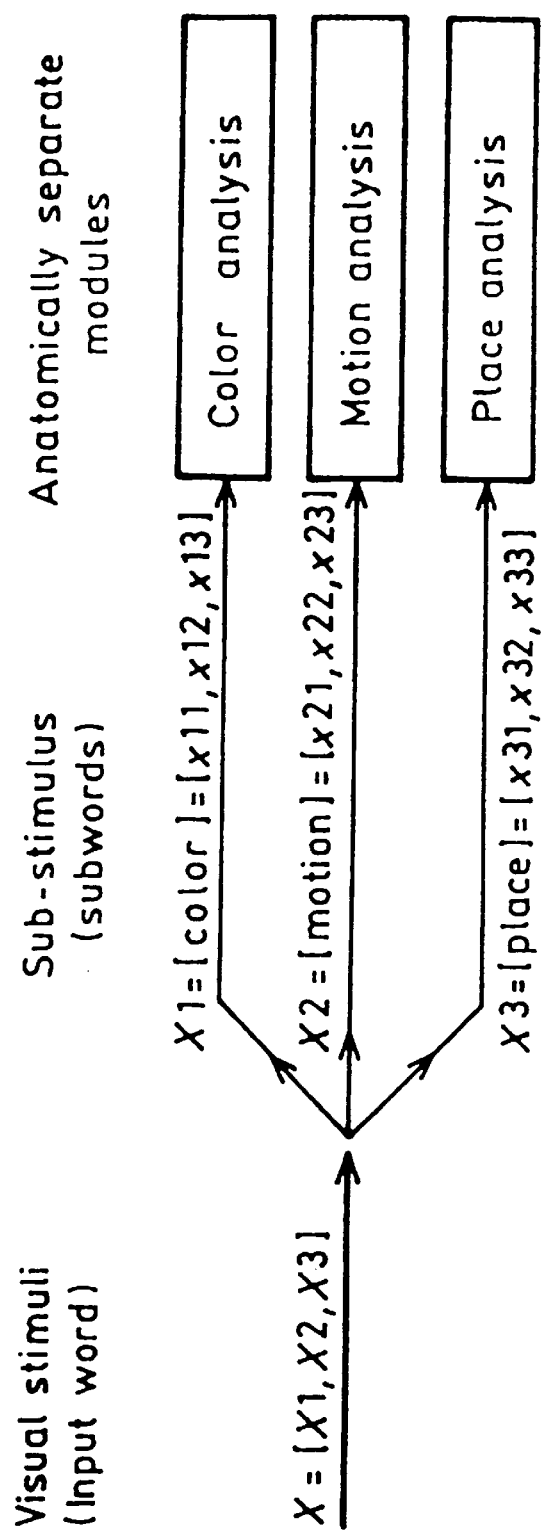
FIG. 6 shows the structure of subwords structured as motion, color, and place.

A primary task of the LAMSTAR invention is to find a winning neuron or a set of neurons that best matches an input word. The input word X is coded in terms of a real vector x given by $$x=[x_1^T, x_2^T, \ldots x_N^T]^T \qquad \text{(Eq. 20)}$$

where T denotes transposition and where xi are subvectors such that $$dim(x_i)=m \qquad \text{(Eq. 21)}$$

m being the number of elements to describe a pattern. Consequently, the corresponding SOM neuron will have r input weights. Each subword $x_i$ is then channeled to a corresponding with SOM module that stores data concerning the with category of the input word (say, color or name). See FIG. 6. As stated earlier, this structure is supported by physiological evidence, specifically, from investigations of the visual cortex which shows that visual data is processed in anatomically separate locations, each considering another feature of that visual scene.

It is important to observe that not all subwords in a word need to be input. The missing subwords will be filled in by extrapolation or interpolation as above, or, if weights are below threshold, will be demanded at a next input (say, demanding further tests on a patient for adequate diagnosis).

Structure of SOM Modules in LAMSTAR Networks

Single SOM module: structure and algorithm

Figure 7:
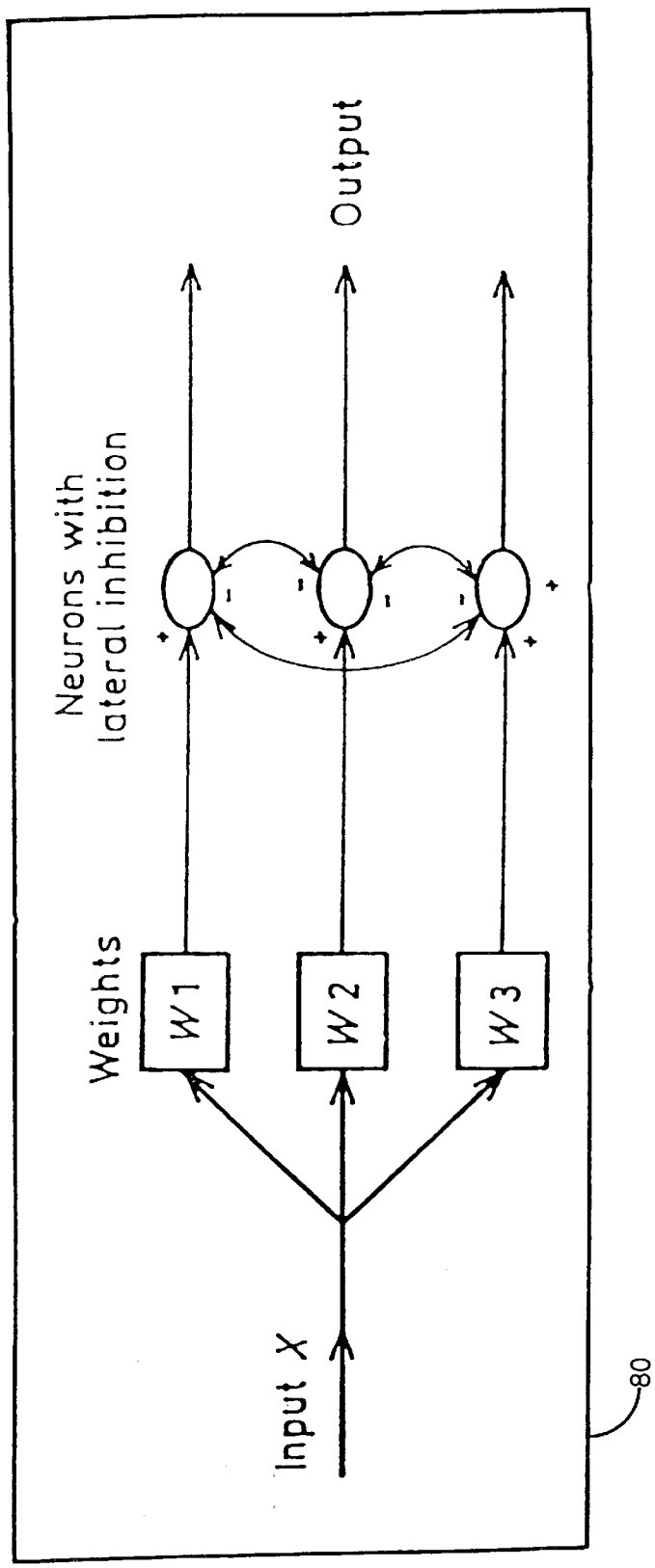
FIG. 7 shows the sub-organized map structure for one subword.

The basic SOM module used is the Kohonen Self Organizing Map 80 as in FIG. 7.

A critical difference between Kohonen's SOM and the LAMSTAR's SOM 10, 20, 30 is its novel processing abilities. Whereas in Kohonen's networks all neurons of an SOM module 80 are checked (scanned), in the LAMSTAR network, a group of p neurons in an SOM module 10, 20, 30 is checked at a time due to the huge number of neurons involved (the large memory involved). This is facilitated due to the Task Evaluation Unit's 60 control capability (see FIGS. 1, 1A), which may determine to evaluate further such finite groups. Feedback from SOM neurons to adjust inport-link weights to the appropriate neurons, as in FIGS. 1 and 3 is another novel difference between the conventional SOM and the present invention.

The SOM module 10, 20, 30 (FIGS. 1, 1A) is a Winner-Take-All (WTA) network where only the neuron (p), (j) with the highest correlation output will have a non-zero output. This is modified for the Task Evaluator 60 when no clear winner is found after scanning a given number of neurons. Otherwise, the WTA rule stands also in the LAMSTAR context. The WTA feature then involves lateral inhibition so that each neuron has a single positive feedback onto itself and negative feedback connections to all other units. Of necessity in case of very many neurons this is modified to allow the task evaluator unit to send inhibitory signals just to all neurons tested which were declared (at some point in the process) to be losers and to all non-tested neurons. The basic WTA structure is shown in FIG. 4.

The SOM network utilizes the grandmother-cell theory where each neuron (i.e., its weights) represents only one concept (sub-word).

The winning neuron is determined by a recursive minimization of a distance norm $\|.\|$ given by:

$$\|x-w_c\|=\min\{\|x-w\|\} \qquad \text{(Eq. 22)}$$

the subscript c denoting the winning neuron and w denoting the weights vector (input weights of a neuron). The iterative algorithm to determine the minimum as in Eq. 22 is $$w(k+1)=w(k)+\alpha_k(x-w(k)); k=0, 1, 2, \ldots \qquad \text{(Eq. 23)}$$

k denoting the iteration number and $\alpha_k$ being a training rate coefficient which, due to convergence considerations is usually of the form:

$$\alpha_k = \frac{\alpha_0}{k} \qquad \text{(Eq. 24)}$$

Links between SOM modules (L-weights)

Individual neurons (p), (j) represent only a limited aspect of an information input. For storage and retrieval efficiency, we do not have a "yellow Volkswagen" neuron. We only have "yellowness" neurons and "Volkswagen" neurons. A meaningful memory of a yellow Volkswagen thus requires linking "yellowness" neurons with "Volkswagen" neurons, via Link weight L as in FIG. 1, namely, linking neurons in one SOM module 10, 20, 30 to others in another SOM module 10, 20, 30. See FIG. 5. This linkage creates a holographic-like storage, since information is distributed between modules. Consequently, in case of failure of one cell, one loses little information if an information word is composed (as it usually is) of many sub-words: say "John's 1967 yellow Volkswagen". Neurophysiological experiments confirm this situation in the biological CNS.

The neurons in one module of the LAMSTAR system are connected with those in another network by excitory links (see FIGS. 3A–3B). The network employs a pseudo-random procedure to set these link weights (denoted as L-links in FIGS. 1, 1A, 2, 3A, and 3B).

Link weight values L are determined by evaluating distance minimization to determine winning neurons, where a win (successful fit) is counted by a count-up element associated with each neuron and its respective input-side links. The count up set mean weight values to be stochastically modulated. Hence, the probability of selecting a given link increases with L.

The stochastic setting of any weight $L_{ij}$. Concerning neuron i of module j is as follows:

(1) Select a random number r from a uniform distribution between 0 and 1, namely:

(2) Now, if $$x \leq \beta = \text{constant} (\approx 0.01 \text{ to } 0.1) \qquad \text{(Eq. 25)}$$

(where β is preset), then select the highest-weighted link of all possible links from the ij neuron concerned.

Else, select two random integers y, z from two mutually independent uniform distributions from 1 to s and from 1 to r(s), respectively, where s=total number of active SOM modules (that have a non-zero) link to any module, not necessarily to the j module)

r(s)=total number of active neurons in the s module (that have a non-zero link weight to any neuron, not necessarily to the ij neuron)

thus randomly scanning the L link-matrix.

(3) Subsequently, activate the link-connection from neuron i,j to neuron y and to its p (say, p=100) neighboring neurons of module x.

(4) If no (SOM-type-) fit is found in any of the p neighborhood neurons of either, the deterministic or the stochastically established linking of Step (2) above, a next iteration is made, repeating (1) to (4) above.

We comment that this random search, which establishes a random link at a low probability, is very fast and requires minimal computation. It is therefore, a plausible model for a similar biological phenomenon. By this procedure, a memory x, y, may be retrieved even if no input sub-word of that category (module, attribute) exists. This feature gives the LAMSTAR invention a powerful extrapolation capability.

Link weight L decays over time. Hence, if not chosen successfully (when approved by the task evaluator), the appropriate $L_{ij}$ will drop forward zero. this helps to avoid the need to consider a very large number of links, thus contributing to network efficiency.

Input links to neurons in SOM modules (V and N weights)

The input word X was shown to be a coded word, comprised of subwords that relate to various categories (input dimensions). Also, each SOM module 10, 20, 30 of the LAMSTAR system 100 corresponds to one of the categories of x such that the number of SOM modules 10, 20, 30 equals the number of subvectors (subwords) $x_i$ in z. Furthermore, the coding of x takes care of proper allocation of $x_i$ to SOM modules Mv. Since each neuron in a category Mv represents (in its weights) one memory of the vth category, say one name of a person out of many names of persons, then the network must channel the input subword of category v to particular neurons in module v.

This channeling task is sequential. In the LAMSTAR network 100, the input subword is channeled to only one SOM module 10, 20, 30 at a time. Furthermore, since the number of neurons in any given SOM category may be huge, this search process may be very lengthy.

To speed up this process, a two stage channeling process is employed. First, weight $V_i$ is selected, as described (see FIG. 1) These determine which subword of any input word is to be first examined, noting that from then on, the inter-module links $L_{ij}$ will take over to consider other subwords. Furthermore, and as is again most important to speed up this search, weights $N_{ih}$ as in FIG. 1 serves to assign priorities to certain neurons of the same SOM module 10, 20, 30. Obviously, priority must be given to the more likely neural fits. This is accomplished feedback based on counting (rewarding) past successes, as in FIGS. 3A and 3B to increase N accordingly or to reduce it, if a "drought" has been observed in utilizing a certain memory, the latter being a forgetting feature, as in FIG. 4. The final setting of N is again subject to stochastic modulation.

The task evaluation unit 60 interrupts the search if necessary (according to say, an outside input, lack of a match after N iteration). It will also give top priority and interrupt 2 to neurons associated with certain subwords, say those related to danger for corresponding user display via display 36 (FIG. 1A). Furthermore, if a group of p neurons in an SOM module 10, 20, 30 failed to yield a memory-fit, the task evaluator 60 may avoid switching the search to the next such group and either stop the search or increase the tolerance to accept a lesser fit.

The determination of $V_i$ follows a very similar feedback reward/forgetting algorithm, and again it will have prioritized weighing for subwords relating to danger, etc. as determined (pre-programmed) by the task evaluator 60.

We note that good initialization of the search via the $V_i$ $V_h$ weights 4 is important for speeding up the system 100, just as is the need to avoid going through all neurons of any SOM module 10, 20, 30, so that the invention remains powerful even with truly large scale memories.

Interpolation/Extrapolation. Filtering and Forgetting Interpolation and extrapolation of missing subwords/browsing capability.

It was shown hereinabove how the activation of a subword of an input word propagates to other modules 10, 20, 30 to activate further subwords relating to the same word via Links $L_i$ as in FIG. 1. Such activation is interpolative and extrapolative in its nature, since it requires the actual subwords of all but the first (the first being determined via links $N_j$) only as a check that is controlled by the task evaluation unit. Hence, if no subword on a certain category was inputed at all (at the input word considered), then such a subword could and is still retrieved through links $L_i$ $N_i$. Say, if the input word describes a person, some link i can retrieve this person's phone number, though the input word contains no such subword. This feature also implies that browsing/wandering takes place, as long as no higher priority is called for by the task evaluation unit. When combined with forgetting, it also provides for filtering.

There are numerous ways to correlate the input subword to the stored subwords contained in the SOM memory cells 10, 20, 30. The correlative links help to establish the most likely SOM memory cell where a winning match may be found. Having gotten to that particular SOM memory cell via the correlative links and associated link weights $L_i$, $L_j$, the network 100 performs a measurement of the correlation between the input subword X1–X3 and the stored subword of interest (not shown). One example of a means for measuring correlation uses the concept known as hamming distance. See, for example, the *Communications Standard Dictionary*, p. 855, Van Nostrand, 1983., herein incorporated by reference.

Figure 1C:
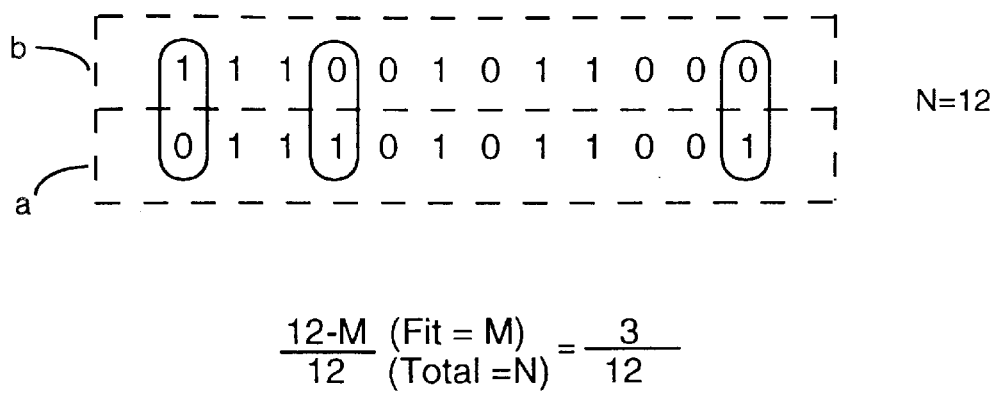
FIG. 1C illustrates the hamming distance neuron correlation process of a preferred embodiment.

In the hamming distance, the total number of bits in each word is the denominator. So, as shown in FIG. 1C, if there are N bits in each subword a, b, then N equals 12. The 12 bits are then correlated, bit position to bit position, so that the most significant bit of the input subword a is compared to the most significant bit of the stored subword b down to the least significant bit of each subword compared. Each compared bit that is the same, or fits, is accumulated as a count.

Therefore, if there are five bits that are the same value and the same bit position between the input subword a and the stored subword b, then the fit equals five. Defining the fit as equal to M, then the hamming distance is $$\frac{N-M}{N} = \frac{12-M}{12} = \frac{3}{12}$$

The task evaluator 60 sets a threshold value for each of the subword categories, so that upon completion of correlation, the correlated hamming distance (or other measure of correlation used, as one of ordinary skill can readily appreciate) can be compared to a predetermined threshold to determine whether the fit is adequate to have reached a winning match. If the hamming distance or measure of correlation is less than the threshold, then additional system processing is needed, either of additional subwords 1–3 within the SOM's or by looking at additional subwords X1–X3 of the same input word X, or by requesting additional input words X or additional tests.

The invention foresees another embodiment of the network 100 wherein rather than simply utilizing a fixed threshold for yes or no to determine a winning match or not, a range of thresholds is provided so that interpolation or extrapolation can be provided to 20 permit selection of stored subwords 1–3 from within a single SOM or between SOM's, dependent on how close the input subword X1–X3 is to the stored subword being correlated. Based on that correlation and the threshold, the correlative link values which are adjusted with winning and losing matches, the network 100 is enabled to extrapolate to determine other input subwords 1–3 which may likely correlate to the input subword X1–X3, even though there is not exact data to provide for that conclusion.

Figure 1D:
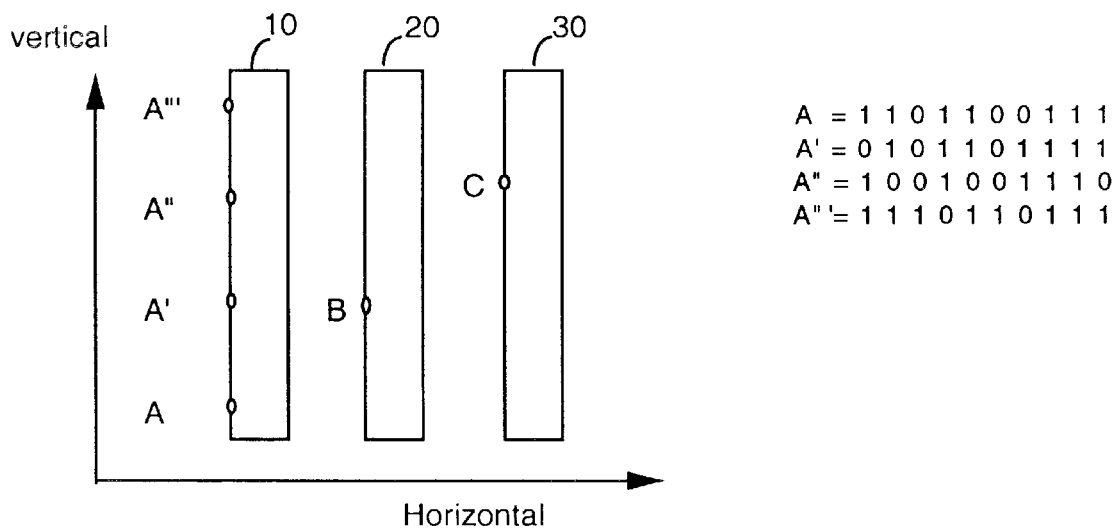
FIG. 1D shows an example of vertical and horizontal correlation.
Figure 2:
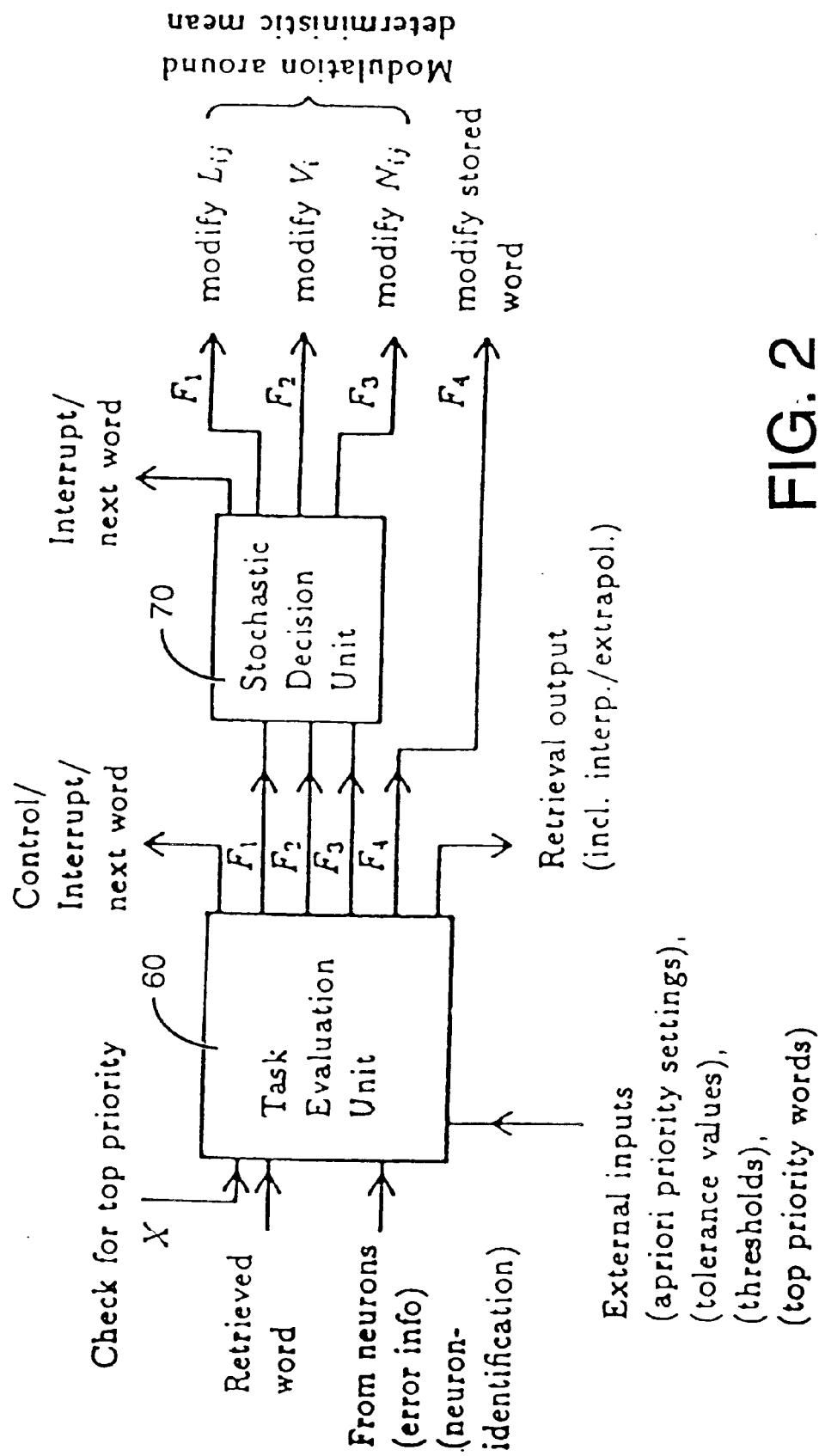
FIG. 2 shows detail of the task evaluation unit and the stochastic modulation unit of the invention.

In performing such interpolation and extrapolation, two types of interpolation and extrapolation are used by the network 100—horizontal and vertical (FIG. 1D). Horizontal proceeds from one SOM to another based on correlative link weights and a history of successive winning matches. Stored hamming distances for correlation results determined for selected memory cells are used for extrapolation based on the stored history of the hamming distance for given categories of input words X. The present invention would thus arrive at a best estimate, i.e., extrapolate or interpolate to determine what the most likely matching SOM memory cell would be based on the stored hamming distance history.

Alternatively, vertical extrapolation and interpolation uses a correlative link within a memory cell to another memory cell within the same SOM to extrapolate and interpolate another SOM based on the stored hamming distance history.

Time associations

Time of occurrence of an event plays a major role in retrieval. When we retrieve a memory of a person, we are helped to refer to the time (say, period in our life) when we came across him (say, he went to elementary school with us). In medical diagnosis, the physician may inquire if a patient had a strong drink close to the time of a feeling of dizziness, etc. The process of retrieval will link subwords and words with others that have a time correlation. Therefore, retrieving the memory of a person from our elementary school day, then, in the absence of another input or an interrupt command from the task evaluator, we may retrieve memories of other persons of our elementary school days. Time correlation employs L links to the time-related SOM module 10, 20, 30 that given high enough link values will retrieve time-correlated memories. This is particularly important if such memories relate to (or trigger) priorities in the task evaluator to allow us to wander that way even in the face of a new input word of less importance. Consequently, it is obvious that associations in time are key to successful linking of subwords and also of words.

Learning and training

The invention provides, among other things, a self-organized network requiring no teacher. However, a-priori priorities can and must be assigned to the task evaluator 60 (say, situations that are life threatening). It starts with (pseudo) random decisions throughout and then learns by counting punishments/rewards (failures/successes), through its feedback as in FIGS. 1, 1A, 3A and 3B. Obviously, all error tolerances must be pre-programmed, as are rates of forgetting. Learning, forgetting and recovery from forgetting are all accomplished through feedback of punishments/rewards to link-weights. Forgetting is incorporated directly into all link-weights as in FIG. 4.

In applications such as medical diagnosis, words for synonyms can be entered via the present invention and links trained for diagnosis by entering symptom/diagnosis pairs (or diagnosis/medication pairs). This will have trained the appropriate L-links between SOM modules 10, 20, 30 as in FIG. 1. Subsequently, when a symptom is entered, extrapolation will take place, to retrieve a diagnosis (or medication) via these L-links. This kind of training resembles human learning: training for a job by accumulating experience, without changing the network or putting it into a special training mode.

Thus, the LAMSTAR system provided by the present invention allows it to deal with very large memories. Its capacity is virtually unlimited. Forgetting clears memories or links. Its modified SOM modules 10, 20, 30 allow it to restrict its search to only a limited number of neurons. In these aspects, the present invention comes closer to true biological storage and retrieval processing. Conventional systems are not applicable to truly large memories. Hierarchical structure, feedback, "intelligence" and learning are shown to be utilized throughout to speed the system up, whereas rigidity is avoided through stochasticity.

The novel employment of link-weights is unique to the LAMSTAR's performance. Direct feedback from neurons to their input-side link-weights and built-in forgetting curves in link-weights all serve to simplify and speed-up search and retrieval and to avoid complex wiring which otherwise may always need to go all the way to/from the task evaluator. Retrieval, learning and extrapolation are all afforded through reward feedback to these essential link-weights.

Essentially in every aspect, the invention adopts methods that agree with behavioral, psychological and/or neurophysiological findings. The present invention is a truly untrained network. Link-weights arrays allow it to function in the face of loss of a number of neurons or links.

The medical and industrial diagnostic case studies that are shown in Appendices A–C illustrate typical applications of the present invention to important problems (though greatly simplified in the examples considered). Obviously, the LAMSTAR network is applicable to many problems, say, literature search, search of legal cases, browsing through the Internet, fault diagnosis in communications systems, usage in automatic testing environments, nuclear power monitoring, avionics fault diagnostics, criminal investigations, internal combustion engine diagnostics, and beyond. Its structure is not at all limited to one or to a few applications. With adequate coding of input words, it is also applicable to problems of speech recognition, scene recognition, etc.

Appendix D sets forth a user's guide to a microprocessor-implemented embodiment of the invention.

From the foregoing, it will be observed that numerous variations and modifications may be effected without departing from the spirit and scope of the present invention. It is to be understood that no limitation with respect to the specific apparatus illustrated herein is intended or should be inferred. It is, of course, intended to cover by the appended claims all such modifications as fall within the scope of the claims.

APPENDIX A

LAMSTAR Case Study: An Application to Medical Diagnosis

General description

Below we show and describe the present invention in terms of an application to a series of greatly simplified examples, including a simulated medical diagnosis problem.

The LAMSTAR (LArge Memory STorage And Retrieval) is a neural-network-based system designed for very fast retrieval of data from a very large memory base. The LAMSTAR neural network requires no computer skills. In the preferred embodiment, the invention is designed for use by any physician, nurse, car mechanic, maintenance person. All one needs is access to a PC or any other computer and to enter observations onto appropriately displayed windows as are automatically provided by the LAMSTAR network. In other applications, no human interaction is at all needed. Data is automatically sent through an interface to the LAMSTAR's input from sensors in the system to be diagnosed, say, an aircraft into which the invention is built. Still, even for aircraft diagnosis no such interface is needed if the PC embodiment is to be used. The system stores and retrieves information in a computationally efficient manner, using neural networks combined with feedback and with statistical decision and correlation tools. It does so in a manner that gives versatility, computational speed (regardless of computer hardware speed), and efficiency that is common in neural networks algorithms. The LAMSTAR system stores information via correlation links among basic concepts, as contrasted with indexing systems used in hierarchical and relational database systems.

The LAMSTAR invention also incorporates interpolation and extrapolation. Thus, even given partially incomplete or incorrect input data, the system can still produce a correct diagnosis decision (such as medical diagnosis or fault diagnosis in an industrial plant or product) or correct information retrieval.

The LAMSTAR system can be utilized as:
a computer-based medical diagnosis system.
a teaching aid.
a tool for industrial maintenance and fault diagnosis.
a tool for data analysis, classification, research, and prediction.

Medical Diagnosis Applications

Nearly all clinical decisions are based on more than one item of data (it is very rare to assign a single symptom to a single diagnosis), and every case if different from another. Therefore, due to its features, the LAMSTAR system is a very effective tool in medical field.

The LAMSTAR's features that are very helpful in medical domain are:
ability to identify multidimensional relationships in the input data.
self training and self organizing with raw data as an input. (no expert assistance is needed for the system training)
interpolation and extrapolation of missing input data.
generalization (partially incorrect or incomplete input data can still produce correct result, say diagnosis).
learning with experience, namely, every analyzed case contributes to the system's medical expertise.

The knowledge base of the system contains a mathematical extract of a series of cases with known outcome inputed to the system in the training phase. As an input, the system accepts data defined by the user, such as, patient's age, height, weight, or very specific data as is shown in the diagnostic case presented below. Then, the system builds the patient model (based on data from past experience and training) and searches the stored knowledge to find the best approximation/description to the clinical features/parameters given as input data.

The system is designed to complement, rather than replace, human diagnosis. Thus, the LAMSTAR's function is to help the physicians to tackle a specific clinical problem by providing information in form of, say:

possible diagnosis
facts about a disease
suggested medication
medication dosage
potential adverse drug reaction
recommended therapy
prediction of the patient's conditions (as is shown in the example below).

In the medical field, the LAMSTAR system can be used as:

Teaching Aid

As a teaching aid, the LAMSTAR system could assist in training of junior staff or less experienced doctors by providing knowledge based for various of tasks that is based on a larger number of cases than they have yet seen. The system can also be utilized as an simulator. As the simulator, the system may predict, say patient physical state after treatment with a specific drug dosage.

Diagnosis Aid

As a diagnosis aid the system is able to provide decision support for experts.

Tool for Data Analysis. Classification and Prediction

Since the medical data, such as symptoms, signs, or measurements, usually overlap, it is difficult to assign a single diagnosis. The LAMSTAR system can provide multidimensional analyzes of input variables that can, for example:

assign different weights (importance) to the items of data, namely, select parameters that are most important in the diagnosis.

find correlations among input variables, such as, medications, patient's condition, circulatory or respiratory systems conditions.

identification, recognition and clustering of patterns.

Figure 8:
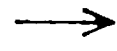
FIG. 8 shows an input word for medical diagnosis.
Figure 8:
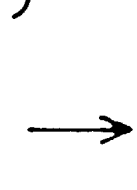
Figure 8:
Figure 8:
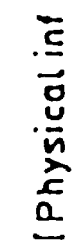

In the example considered, the LAMSTAR invention analyzes an input word x that contains information above concerning patients and/or possibly diagnosis information, recommendations of medication and their side effects, etc. An example of an input word x for this case study is given in FIG. 8. The input word as above contains seven subwords ($x_i$) that describe the patient's condition in coded form. Each subword is thus a vector of real numbers, say, a heart/lung status subword (heart rate, ventilation rate, partial oxygen pressure: $PO_2$) and a physical characteristics subword (age, gender, occupation, name).

Sample outputs

Figure 8A:
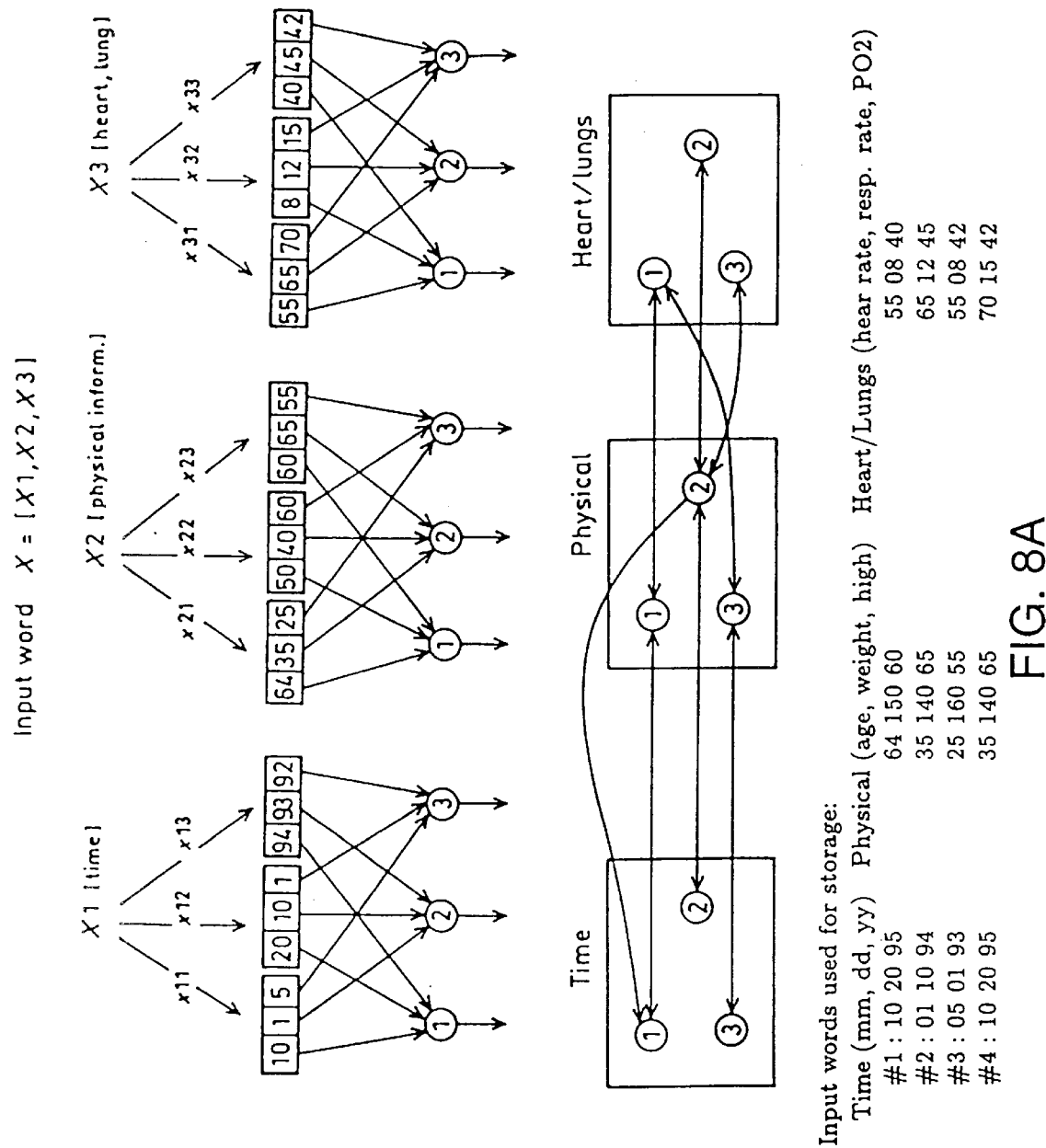
FIG. 8A shows SOM modules and their correlation linking structure.

FIG. 8A illustrates the internal organization of three SOM modules relating to time, heart/lung status and physical characteristics. It also shows the correlation links after four different subwords have been stored.

Figure 8B:
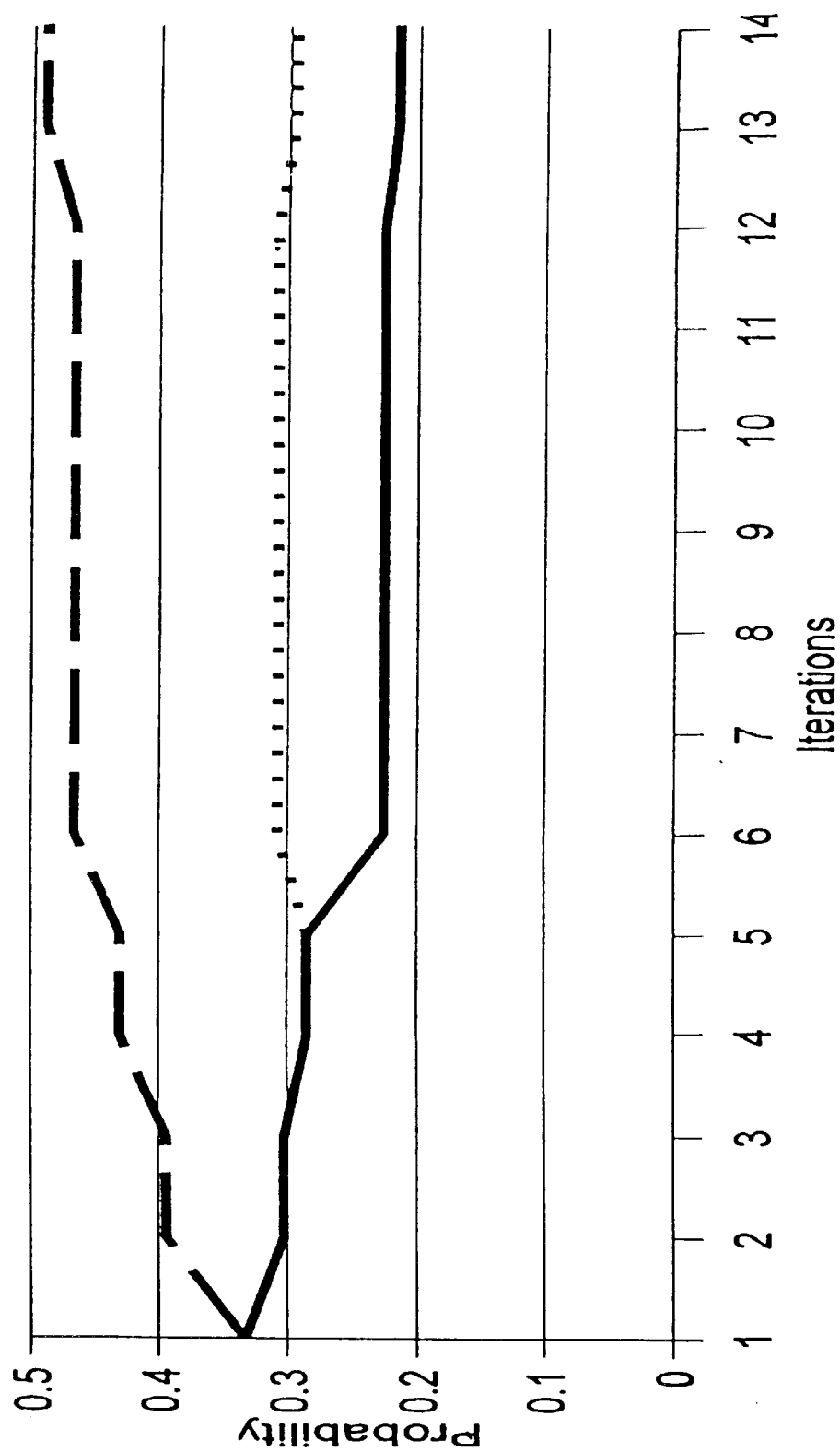
FIG. 8B sets forth a Table 1 for information retrieval results of an example of the present invention and probability changes of input subwords in the medical diagnosis simulation example.

Table 1 illustrates a step-by-step information retrieval process with different inputs. FIG. 8B shows changes in the probability for selecting a subword, due to the information retrieval process of Table 1. The Table illustrates how the invention interpolates input words with subwords not seen before (iterations #1, #2, FIG. 8A) and how it extrapolates input works with missing subwords (in all iterations shown). Iteration 6 of Table 1 illustrates the invention's ability to detect correlations that it has never seen before .

Coded output words of three subwords each are given in Table 1, when related to the corresponding input words, the SOM modulator and the task evaluator's decisions. In Table 1, "accept" or "stop-search" denote a diagnostic decision to match the input to an already accepted (or trained) decision-word/diagnosis (namely, the output word). F1 and F2 (Table 1) indicate a failed match, and hence, continuation of search (new-memory or SOM module).

A LAMSTAR program for a simplified medical diagnosis problem.

Figure 9:
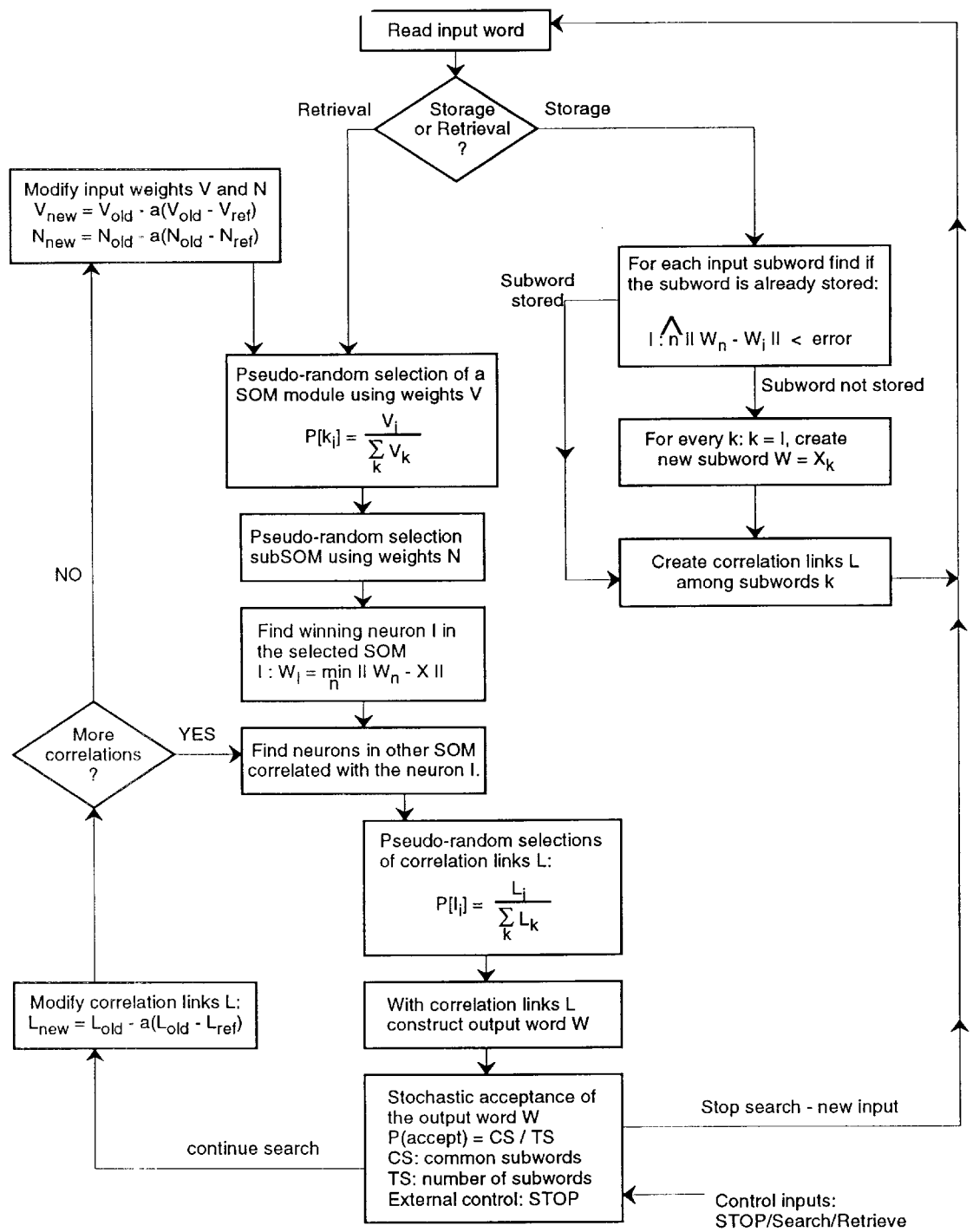
FIG. 9 shows a flow chart directed toward the system provided by the present invention.

FIG. 9 gives a flow chart for a simplified LAMSTAR medical diagnosis program.

The program printout is given below.

```
/*
The code for LAMSTAR network is C, as this language combines high-
level structures with the speed and compactness of assembler. In
the program we try to use programming techniques described by ANSI
C. Therefore, the code can be easily adapted to almost all C
compilers. We attempt to avoid specialized structures, I/O
interfaces etc.. No special libraries are ever referenced, so that
translation to other languages or compilers should not be
difficult.
The operation of each functions is thoroughly discussed in the
accompanying text. Thus, the description that follows the code will
focus on programming implementation of the presented model.
All symbolic constant names are written in upper case, e.g.
SUBWORD, so they can be readily distinguished from variable names
(lower case, e.g. input) or functions names (only the first letter
in upper case, e.g. ReadInput).
The program's functions and structures can be easely modified when
specific application requirements are needed.
*/
// only two standard libraries are used
#include <stdlib.h>
#include <iostream.h>
// all of the network's variables are defined
#define SUBWORD 3          // the number of analyzed categories (subwords)
#define SUBELEM 1          // dimension of a subword
#define MAXPATT 2          // the maximum number of patterns stored in one SOM
#define LEARNCO 0.1        // learning coefficient used in on-line learning of SOM.
punishment and reward procedures
#define MAXLINK 2          // maximum value of the correlation links and input weights
#define MINLINK 0.1        // minimum value of the correlation links and input weights
#define SOMERRO 0.2        // maximum error acceptable in SOM search
#define TIMESUB 1          // subword assigned with 'time' subword
#define FORGETT 0.2        // forgetting threshold
#define SUBNEUR 2          // the number of neurons in a subSOM module
#define SUBSOM 2           // the number of subSOM in one SOM module
#define DECAYCOEFF 0.04    // decay (forgetting) coefficient
#define DETERMI 0.05       // DETERMI defines probability of random (not deterministic)
selection of links
#define MAX(a,b) (a>b)?a:b
#define MIN(a,b) (a<b)?a:b
// functions initialization
int StoreOrRetrieve();
void ReadInput(int *input, int *status);
void StoreInputWord(int *input, int *status, int *nrPattern);
int RandomSelection(float *weights, int length);
int SomSearch(int winCategory, int *input, int *stm, int *nrPattern, float
*subWeights, int *start);
void FindCorrel(int winCategory, int winPattern, float *output, int *input, int
*status, int *nrPattern);
int AcceptOutput(float *output, int *input);
void PunishInputWeights(int winCategory, float *inputWeights, float *subWeights,
int start);
void RewardInputWeights(int winCategory, float *inputWeights, float *subWeights,
int start);
void PunishCorrLinks(int winPattern, int winCategory);
void RewardCorrLinks(int winPattern, int winCategory);
void TimeDecayCorrLinks();
// global variables
float someWeights[SUBWORD][MAXPATT][SUBELEM];
float correlLinks[SUBWORD][MAXPATT][SUBWORD][MAXPATT];
int outPattern[SUBWORD]; // outPatterns contains winning neurons in each SOM.
// Funcion main is explained in details in Figure: Flow Chart.
main()
{
int storeRetrieve; // if 1 - retrieval, if 0 - storage
int nrPattern[SUBWORD]; //the number of patterns stored in SOM specified by
SUBWORD
int input[SUBWORD][SUBELEM]; //input word as a matrix SUBWORD x SUBELEM.
int status [SUBWORD]; //indicates subwords that are present in the input word.
int winCategory; //the winner from pseudo-random subword selection.
int winPattern; //the winner of latheral inhibition in SOM winCategory.
int accept; // accept = 1 -> output is accepted, accept = 0 -> find new output.
int stm[SUBWORD]; // short term memory
int start; // the subSOM selected for the search
```

```
-continued float subWeights[SUBWORD][SUBSOM]; // weights used for subSOM selection
float output[SUBWORD][SUBELEM]; //retrieved informatin
float inputWeights [SUBWORD]; //weights used for pseudo-random subword selectoin
char end; //character 'end' signals the end of the program
//start of the program as in Figure 9 (Flow Chart)
    do{
        storeRetrieve = StoreOrRetrieve(); //Store or retrieve input word
        ReadInput(&input[0][0], &status[0]);
        if(storeRetrieve) (
            //retrieval of information
            while(!accept){     // repeat until the output is accepted
                do{             // pseudo-random selection of the input word
                    winCategory = RandomSelection(&inputWeights[0], SUBWORD);
                } while (status[winCategory]);
                winPattern = SomSearch(winCategory, &input[0][0], &stm[0], &nrPattern[0],
&subWeights[0][0], &start);
                        FindCorrel(winPattern, winCategory, &output[0][0], &input[0][0],
&status[0], &nrPattern[0]);
                accept = AcceptOutput( &output[0][0], &input[0][0]);
                // punishment and reward and reward of links and weights
                if(!accept){
                    PunishCorrLinks(winPattern, winCategory);
                        PunishInputWeights(winCategory, &inputWeights[0], &subWeights[0][0],
start);
                }
                RewardCorrLinks(winPattern, winCategory);
                        RewardInputWeights(winCategory, &inputWeights[0], &subWeights[0][0],
start);
                TimeDecayCorrLinks();
            }
        }
        else{
            //storage of the input word
            StoreInputWord(&input[0][0], &status[0], &nrPatternt[0]);
        }
        cin >> end;    //a space will continue the program
    }
    while (end==' ');
}
int StoreOrRetrieve()
// the function ask for storage (1) or retrieval (0) procedures
{
    int answer;
    cout << *Store (0) or retrieve (1):*;
    cin >> answer;
    if(answer) cout << *Retrieval\n*;
    else cout << *Storage\n*;
    return answer;
}
void ReadInput(int *input, int *status)
// read input word, status indicates these subwords that are present in the input
word
{
    int i,j;
    for(i = 0; i < SUBWORD; i++){
        cout << *Enter * << i+1 <<* th subword*;
        status[i] = 0;
        for(j = 0; j < SUBELEM; j++){
            cin >> input[i*SUBELEM + j];
            if(input[i*SUBELEM + j]) status [i] =1;
            cout << *subword:* << input[i*SUBELEM +j] << *\n*;
        }
    }
}
void StoreInputWord(int *input, int *status, int *nrPattern)
// store only the input words that are not already stored.
// make correlation links among stored subwords
{
    int i,j,k;
    float error[MAXPOINT];
    int storedPattern[SUBWORD];
    int stored;
    // find if the subwords are not stored
    for(i = 0; i < SUBWORD; i++)(
        storedPattern[i] = -1;
        if(status[i]) {
            for(j = 0; j < MAXPATT; j++) {
                error[j]=0;
                for(k = 0; k < SUBELEM; K++)
                    error[j]  +=  (abs(someWeights[i][j][k]-input[i*SUBELEM +
```

```
k])/(0.2+input[i*SUBELEM + k]));
                if(error[j] < SOMERRO) {
                    stored = 1;
                    storedPattern[i] = j;
                    // modify the stored subwords
                    for(k =0; k < SUBELEM; k++)
                        somWeights[i][j][k] += (LEARNCO * (somWeights[i][j][k] -
input[i*SUBELEM + k]));
                }
            }
        }
        // store the subwords as a new patterns
        if(!stored && nrPattern[i] < MAXPATT){
            for(j=0; j< SUBELEM; j++) somWeights[i][nrPattern[i]][j] = input[i*SUBWORD +
j];
            ++nrPattern[i];
        }
    }
    // make correlation links among subwords in the input word
    for(i=0; i<SUBWORD; i++){
        for(j=0; j<SUBWORD; j++){
            if(storedPattern[i] >= 0 && storedPattern[j] >= 0)
                correlLinks[i][storedPattern[i]][j][storedPattern[j]] = MAXLINK;
        }
    }
}
int*RandomSelectoin[float *weights, int length]
// pseudo-random selection of a number from PDF described by weights
{
    int i, answer;
    float k, sum, low, high;
    for(i=0; i< length; (++) sum += weights[i];
    k = (float) rand()/32767;
    // 32767 is the highest random number
    for(i=0; i < length; i++){
        high += weights[i]/sum;
        if(k > low && k <= high) answer = i;
        low = high;
    }
    return answer;
}
int SomSearch(int winCategory, int *input, int *stm, int *ntPattern, float
*subWeights, int *start)
// find winning neuron in SOM - winCategory
{
    int i, j, k, answer;
    float error, minerror = 0;
    // check short term memory
    if(stm[winCategory]){
        error = 0;
        for(i=0; i < SUBELEM; i++)
                                                                            error       +=
(abs(somWeights[winCategory][stm(winCategory)][i]-input[winCategory*SUBELEM
+i])/(0.2+input[winCategory*SUBELEM+ i]));
        if(error[stm] < SOMERRO) (answer = stm[winCategory];
            return answer;
        }
    }
    // check the rest of the neurons
    for(i = 0; i < nrPattern[i]; i++){
        // pseudo-random selection of subSOM
        if(nrPattern[i] / (SUBNEUR*SUBSOM) > 9) {
            *start = RandomSelectoin(&subWeights[winCategory*SUBSOM], SUBNEUR);
            k = *start;
            error = 0;
            for(j = k*SUBNEUR; j < (k*SUBNEUR + SUBNEUR); j++)
                error += (abs(somWeights[winCategory][i][j]-input[winCategory*SUBELEM +
j])/(0.2+input[winCategory*SUBELEM + j]));
            if(error < minerror){
                // update the short term memory
                stm[winCategory] = i;
                // reward subSOM weights for sub-SOM selection
                subWeights[winCategory][k] -= (LEARNCO * (subWeights[winCategory][k] -
MAXLINK));
                answer = i;
                minerror = error;
            }
        }
        // if no subSOM created - check all neurons
        else{
```

```
        error = 0;
        for(j = 0; j < SUBELEM; j++)
            error += (abs(somWeights[winCategory][i][j]-input[winCategory*SUBELEM +
j])/(0.2+input[winCategory*SUBELEM + j]));
        if(error < minerror){
            stm[winCategory] = i;
            answer = i;
            minerror = error;
        }
      }
    }
  }
  return answer;
}
void FindCorrel(int winCategory, int winPattern, float *output, int *input, int
*status, int *nrPattern)
// construct output word through the correlation links
(
  int i,j,l,k;
  int timeCorr;
  int chosenCorr;
  int corr[MAXPATT];
  float corrWeights[MAXPATT];
  float maxlink, error, minerror;
  int outStatus[SUBWORD];
  for(i = 0; i < SUBWORD; i++)
     outStatus[i]=0;
     // find correlation links with 'time' subword
     for(i = 0; i < SUBELEM; i++){
        output[winCategory*SUBELEM + i] = somWeights[winCategory][winPattern][i];
        ++outStatus[winCategory];
     )
     outPattern[winCategory] = winPattern;
     if(rand()/32767 > DETERMI){
        for(i = 0; i < MAXPATT; i++){
           if(correlLinks[winCategory][winPattern][TIMESUB][i]){
              corr[l]=i;
              corrWeights[1]=correlLinks[winCategory][winPattarn][TIMESUB][i];
              ++1;
           }
        }
        maxlink = 0;
        // find the highest link weight between time and the chosen subword
        for(j = 0; j < 1; j++){
           if (corrWeight[j] > maxlink) { timeCorr = corr[j];
                          maxlink = corrWeights[j];)
              }
        for (j = 0; j < SUBELEM; j++)
           error += (abs(somWeights[TIMESUB][maxlink][j]-input[TIMESUB*SUBELEM +
j])/(0.2+input[TIMESUB*SUBELEM + j]));
        if(error < SOMERRO) timeCorr = maxlink;
        else{
           // pseudo-random selection of links
           // timeCorr is the winning neuron in the 'time' SOM
           chosenCorr = RandomSelection(&corrWeights[0], 1);
           timeCorr = corr[chosenCorr];
        }
        for(i = 0; i < SUBELEM; i++){
           output[TIMESUB*SUBELEM + i]= somWeights[TIMESUB][timeCorr][i];
           ++outStatus[TIMESUB];
        }
        outPattern[TIMESUB] = timeCorr;
     }
     // pseudo-random selection of time neuron
     else{
        timeCorr = rand() * nrPattern[TIMESUB] / 32767;
        for(i = MAX(0,timeCorr -2); i< MIN(timeCorr -2,nrPattern[TIMESUB]); i++){
           error = 0;
           for(j = 0; j < SUBELEM; j++)
              error += (abs(somWeights[TIMESUB][i][j]-input[TIMESUB*SUBELEM +
j])/(0.2+input[TIMESUB*SUBELEM + j]));
           if(error < minerror) {
              timeCorr = i;
              minerror = error;
           }
        }
     }
     // find the output correlated with the input and time.
     for(i = 0; i < SUBWORD; i++) {
        l = 0;
        for(j = 0; j < MAXPATT; j++){
```

-continued

```
                    if(correlLinks[winCategory][winPattern][i][j]   &&
correlLinks[TIMESUB][timeCorr][i][j])
                    (corr[l]=j;
                    corrWeights[l]=correlLinks[winCategory][winPattern][i][j];
                    ++l;
            }
        }
        if(rand()/32767 > DETERMI) {
                maxlink = 0;
                // find the highest link weight between time and the chosen subword
                for(k = 0; k < l; k++){
                        if (corrWeights[k] > maxlink){
                            timeCorr = corr[k];
                            maxlink = corrWeights[k];
                        }
                }
                for(i = 0; j < SUBELEM; j++)
                        error += (abs(somWeights[i][maxlink][j]-input[i*SUBELEM +
j])/(0.2+input[i*SUBELEM + j]));
                if(error < SOMERRO) timeCorr = maxlink;
                // pseudo-random selection of links.
                else{
                        chosenCorr = RandomSelection(&corrWeights[0], 1);
                        timeCorr = corr[chosenCorr];
                        for(k = 0; k < SUBELEM; k.++){
                            output[i*SUBELEM + k] = somWeights[i][timeCorr][k];
                            ++outStatus[i];
                        }
                }
        }
        else{
                timeCorr = rand() *nrPattern[i] / 32767;
                for(k = MAX(0,timeCorr -2); k< MIN(timeCorr -2,nrPattern[i]); k++){
                        error = 0;
                        for(j = 0; j < SUBELEM; j++)
                            error += (abs(somWeights[TIMESUB][i][j]-input[TIMESUB*SUBELEM +
j])/(0.2+input[TIMESUB*SUBELEM + j]));
                        if(error < minerror) {
                            timeCorr = k;
                            minerror = error;
                        }
                }
        }
outPattern[i] = timeCorr;
)
// find output subwords not correlated with 'time'
i = 0;
while(!outStatus[i] && i < SUBWORD){
        l = 0;
        for(j = 0; j < SUBELEM; j++){
                if(correlLinks[winCategory][winPattern][i][j]){
                        corr[l]=i;
                        corrWeights[l]=correlLinks[winCategory][winPattern][j][i];
                        ++l;
                }
        }
        // pseudo-random selection of links
        chosenCorr = RandomSelection(&corrWeights[0], 1);
        timeCorr = corr[chosenCorr];
        for(k = 0; k < SUBELEM; k++){
                output(i*SUBELEM + k] = somWeights[i][timecorr][k];
                ++outStatus[i];
        }
        ++i;
        outPattern[i] = timeCorr;
    }
}
int AcceptOutput(int *status, float *output, int *input)
// decide if the output word should be accepted
{
    int j,i,answer;
    int correctSub = 0;    // the number of correctly retrieved subwords
    float k, error;
    k = (float) rand()/32767;
    for(i = 0; i < SUBWORD; i++){
        if(status[i]){
                error = 0;
                for(j = 0; j < SUBELEM; j++)
                        error += (abs(output[i*SUBELEM + j]-input[i*SUBELEM
+j])/(0.2+input[i*SUBELEM + j]));
```

```
            if (error < SOMERRO) ++correctSub;
        }
    }
    // stochastic acceptance
    if(k > (float) correctSub/SUBWORD) {
        // external acceptance
        cout << *Accept the output? (1 - yes, 0 - no)\n*;
        cin >> answer;
        return answer;
    }
    else return 0;
}
void PunishInputWeights(int winCategory, float *inputWeights, float *subWeights,
int start)
// decrease input weights
{
        subWeights[winCategory*SUBSOM + start]   -=   (LEARNCO  *
(subWeights[winCategory*SUBSOM + start]-MINLINK));
    inputWeights[winCategory] -= (LEARNCO * (inputWeights[winCategory]-MINLINK));
}
void RewardInputWeights(int winCategory, float *inputWeights, float *subWeights,
int start)
// increase input weights
{
        subWeights[winCategory*SUBSOM + start]   -=   (LEARNCO  *
(subWeights[winCategory*SUBSOM + start]-MAXLINK));
    inputWeights[winCategory] -= (LEARNCO * (inputWeights[winCategory]-MAXLINK));
}
void PunishCorrLinks(int wp, int wc)
// decrease correlation links
{
    int i,j;
    for[i = 0; i < SUBWORD; i++]{
       for(j = 0; j < SUBWORD; j++]{
          if(correlLinks[i][outPattern[i][j]][outPattern[j]] > FORGETT)
             correlLinks[i][outPattern[i][j]][outPattern[j]] -= (LEARNCO *
(correlLinks[wc][wp][i][j]-MINLINK));
          else correlLinks[wc][wp][i][j] = 0;
       }
    }
}
void RewardCorrLinks(int wp, int wc)
// increase correlation links
{
    int i,j;
    for(i = 0; i < SUBWORD; i++){
       for(j = 0; j < SUBWORD; i++){
             correlLinks[i][outPattern[i][j]][outPattern[j]] -= (LEARNCO *
(correlLinks[i][outPattern[i][j]][outPattern[j]]-MAXLINK));
       }
    }
}
void TimeDecayCorrLinks()
// Time decay of correlation links
// correlLinks is a global variable
{
    int i,j,k,l;
    for(i = 0; i < SUBWORD; i++){
       for(j = 0; j < MAXPATT; j++){
          for(k = 0; k < SUBWORD; k++){
             for(l = 0; k < SUBELEM; 1++)
                correlLinks[i][j][k][l] -+ DECAYCOEFF;
          }
       }
    }
}
```

APPENDIX B
Industrial Maintenance and Fault Diagnosis Applications.

As a diagnostic tool, the LAMSTAR can analyze a fault, and determine what underlying phenomena and criteria relate to the fault, and which maintenance/testing steps are to be taken. Therefore, the possible application of the system in industry may include:

diagnosis and fault detection/description in a car or a plane monitoring of an industrial plant operation decision or control tool for an industrial plant or system and its maintenance.

The system only requires the input of readily available data and symptoms in user's notation. It is self-training in the sense that only past data trains or retrains the system without requiring a change in the underlying program or operation. When using LAMSTAR for diagnosis purposes, the system provides solutions in response to manually or automatically supplied data (symptoms). The solutions provided by the LAMSTAR system may be:

a suggestion to perform a specific test, or a maintenance action, or inspection, or to replace a module.

time needed to complete the repair/maintenance task.

what is required to be further tested.

evaluation of the analyzed system's condition.

The LAMSTAR continually adjusts its solution or browsing results via a reward and punishment internal feedback system. If the LAMSTAR was correct in its deduction/browsing as determined by the user confirmation, it reinforces the processing path by increasing the weighing of the associated correlation links which lead to the solution. If the LAMSTAR was wrong, it weakens the analysis which lead to the solution.

The LAMSTAR application to Industrial Fault Diagnosis is essentially parallel to that explained in detail below for Medical Diagnosis.

APPENDIX C

Another Specific Medical Diagnostic-Aid Example

In the particular example discussed below, the LAMSTAR system is applied to aid in a typical urological diagnosis problem. It evaluates a patient's condition and provides long term forecasting after surgical removal of renal stones (Extracorporeal Shock Wave Lithotripsy, denoted as ESWL). The ESWL breaks very large renal stones into small pieces which are naturally removed from the kidney with the urine. Unfortunately, the large kidney stones appear again in 10% to 50% of patients (1–4 years after the surgery). It is difficult to predict (with reasonable accuracy, more than 50%) if the operation was a success or a failure, due to the large number of analyzed variables.

The LAMSTAR system predicts success or failure of the surgery from correlation among the variables, not from the variables alone. Using actual clinical historical data, for 100 cases, the LAMSTAR predicted correctly 95% of the cases. By comparison, a multilayer neural network based classifier, based on years of clinical development was able to predict correctly 90% of the cases, but it required 1000 times the number of computational steps of the LAMSTAR program. The statistical classifiers (linear and quadratic discriminants), which are the standard methods for medical classification and discrimination problems, give both 36.4% classification accuracy. All programs used exactly the same data and in the same format.

A system which correctly predicts which patients are in danger for stone recurrence after ESWL, can dramatically cut down costs of treatment by reducing the need for subsequent ESWL. When the recurrence of stones is detected early enough, the very costly ESWL treatment can usually be replaced by:

use of medications.

more aggressive surveillance.

Structure and Format of the Analyzed Data—A Medical Diagnosis Example

In this particular example, the input data (denoted as a "word" per each analyzed case) is divided into 16 subwords (categories) (Table 2). The length in bytes of each subword in this example varies from 1 to 6 (category 5). The subwords contain information about a patient's physical characteristics (age, race, gender), his/her conditions after and before the surgery (stones location, type, volume etc.). The system attempts to predict the result (failure/success) by analyzing the correlations among the subwords (categories) variables provided by the user. It then automatically adjusts the weighing and mapping correlation links accordingly.

The system's categories for this example are defined by number (in this case 1 to 16) with the meaning, and parameters as shown in Table 2.

All input parameters (subwords/categories), are real numbers. Therefore, the user enters only numbers into fields assigned to specific subwords/categories. Data for a partial set of categories can be entered, and LAMSTAR makes its best correlation of a solution. Table 3 shows a partial set of categories that produced correct diagnosis.

TABLE 2

Input data used in the Medical Diagnosis-Aid Example.

| Category | Meaning | Parameter |
|---|---|---|
| 1 | Age | 1–100 |
| 2 | Gender | Man, Woman |
| 3 | Race | Black, White, Hispanic, Oriental |
| 4 | Stone Chemistry | Calcium, Cystine |
| 5 | Stone Location | Parenchyma, Pelvis, Ureter, Cylyx |
| 6 | Stone Configuration | Staghorn, Abnormal Anatomy, Cylyceal |
| 7 | Stone Location in Kidney | Bilateral |
| 8 | Acid Type and Levels | Metabolic, Hypercalciuria/uricosuria |
| 9 | Culture Last | Catheter |
| 10 | Time of the Surgery | Time (in years) |
| 11 | Stone partition | Fragments, Volume |
| 12 | Retreatment Procedure | Medical Terms for Retreatment |
| 13 | Medical Therapy | Allopurinol, Thazides, Both |
| 14 | Volume | 1–20 (ml) |
| 15 | Previous Stones | 1–20 (# of stones) |
| 16 | History of Prev. Stones | Type, Other Stones |
| Diagnosis | Long Term Forecast | Success/Failure |

TABLE 3

| Category (meaning) | User's Input (as actually inputted) |
|---|---|
| 1 (age) | 45 |
| 10 (time) | 5 |
| 14 (volume) | 4 |
| 15 (# of stones) | 8 |

APPENDIX D

LAMSTAR and Its Graphical User Interface (GUI)

Graphical User Interface

The LAMSTAR system is controlled by the user through a standard Graphical User Interface (GUI) illustrated in FIG. 10 as designed for Microsoft WINDOWS 3.1. The GUI provides an easy way to enter data (editor windows), to display the results ("Output" and "Result" windows), or to execute a command (keys: "Store", "Retrieve", "Save"). The user manipulates a mouse to 'point and click' on items he or she wants to activate.

When you start the LAMSTAR, the screen (as in FIG. 10) is divided into different areas, as is described below.

The following elements are part of the LAMSTAR GUI:

Menu Bar with pull-down menus.

Editor windows and Categories Labels.

Command keys.

Case ID and Diagnosis editor windows

Categories' Information Buttons.

Figure 11:
FIG. 11 shows a menu bar with pull down menus directed to the embodiment of FIG. 10.

Menu Bar with Pull-Down Menus (FIG. 11)

The Menu Bar 11 contains a list of commands or options to chose from. The LAMSTAR GUI has the following menus to choose from: File, Options, Help.

Figure 12A:
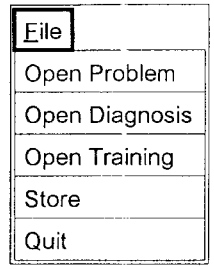
FIGS. 12A, 12B, 12C, 12D, 12E, 12F, 12G, 12H, 12I, 12J, 12K, 12L, and 12M show option menus for implementation of the embodiment of FIG. 10.

"File" pull-down menu: (FIG. 12A)

Allows the user to select a data file for a specific diagnosis problem, training, diagnosis or automated diagnosis without any manual data entry.

Figure 12B:
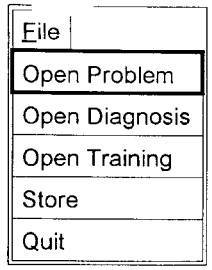

The "File" pull-down menu contains the following options:

"Open Problem" (FIG. 12B)—opens a file that provides:

- categories' names such as defined hereinafter for a medical example.
- stored information—values for each category defined hereinafter.
- correlation links between the stored values.

Since, the LAMSTAR can be used as a diagnosis aid for different problems, this option is used for employing the LAMSTAR system for a specific diagnosis problem, such as the problem defined above. Thus, when the user wants to use the LAMSTAR for the problem, he or she uses this option to load to the system the data file specific to this problem. If the user wants to use the LAMSTAR for different problem, say, heart condition evaluation, a different file is load to the system.

Figure 12C:
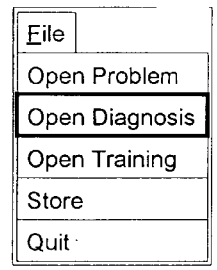

"Open Diagnosis" (FIG. 12C)—opens a file for automated diagnosis.

The selected file contains:

- parameters' data as specified hereinabove for the medical diagnosis-aid example.

When opening this file, the program automatically reads the data used for diagnosis. This option is used for automated diagnosis without any need for manual data entry. This option is primary used when patients' data were:

- collected by using computer-based data acquisition equipment.
- stored in an easily accessible data base system.

Figure 12D:
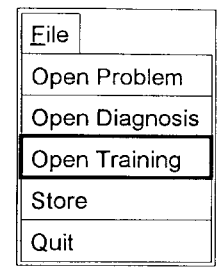

"Open Training" (FIG. 12D)—opens a file with data for the system training.

As in the "Open Diagnosis" option, when opening this file, the program automatically reads the data sets to be used for the LAMSTAR training.

This option is used for:

- creating a new application for the LAMSTAR system.
- extending the already existing links and stored information for a specific application with new data sets. Thus, the LAMSTAR assimilates new information (load using the "Open Training" option) into the already stored data (load using the "Open Program" option).

Figure 12E:
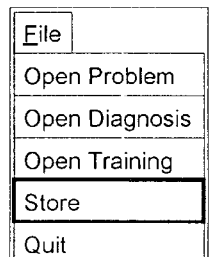

"Store" (FIG. 12E)—stores data as inputted by the user into a selected file.

This option is used for:

- saving categories names and correlation links after the training phase with new data set.
- saving new correlation links after connecting new data sets with existing categories names and correlation links.
- saving the modified correlation links which are a result of the internal reward/punishment feedback.

Figure 12F:
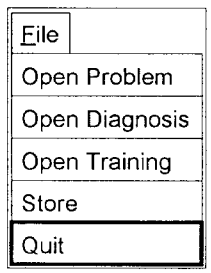

"Quit" (FIG. 12F)—exits the program.

The "Quit" key stops the current LAMSTAR session. The "Quit" key returns the operating system to the program that started the LAMSTAR, say MicroSoft Windows.

Figure 12G:
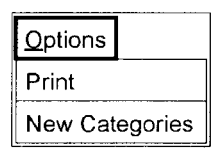

"Options" pull-down menu. (FIG. 12G)

The "Options" pull-down menu allows the user to print the diagnosis results and to create new categories for training with new data sets (as explained in Section 4.1).

Figure 12H:
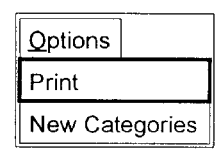

The "Options" pull-down menu contains the following options:

"Print" (FIG. 12H)—prints the results.

The "Print" option allows the user to print:

- diagnosis results.
- input, output, and result data.

Figure 12I:
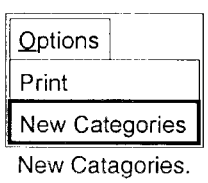

"New Categories" (FIG. 12I)—the option "New Categories" starts a program that allows the user to: create a new problem, add a categories to an existing problem, delete a category, and add diagnosis information.

Figure 12J:
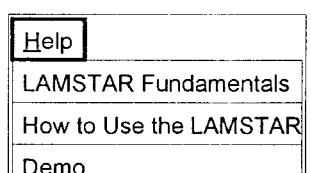

"Help" pull-down menu: (FIG. 12J)

Online help provides a quick way to get information about the LAMSTAR. This is fast and easy way to find answers to a "how to" questions.

Figure 12K:
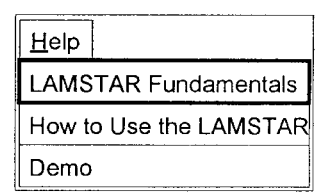

The "Help" pull-down menu offers the following options:

"LAMSTAR Fundamentals" (FIG. 12K) provides a short introduction to the LAMSTAR data processing system. Also, the LAMSTAR applications to medical diagnosis and industrial maintenance and fault diagnosis are outlined.

Figure 12L:
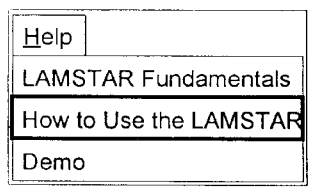

"How to Use the LAMSTAR" (FIG. 12L) explains the system training and the retrieval of information process.

Figure 12M:
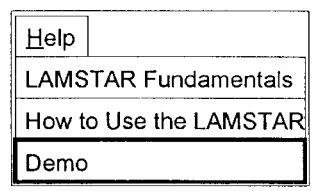

"Demo" (FIG. 12M) Demo program is a simple diagnosis session that shows step-by-step procedures required for diagnosis with the LAMSTAR system.

Editor Windows and Categories' Labels

Editor windows: (FIG. 13)

The editor windows in the LAMSTAR GUI have two purpose:

1. They allow the user to manually enter the data "Input (i/p)".
2. They show retrieved information "Fit" and "Final output (o/p)".

The LAMSTAR GUI, as shown in FIG. 13, has four groups of editor windows.

Categories: Shows names of the categories selected from the "Categories" pull-down menu. When the user selects categories names, the chosen names appear in the "Categories Editor" windows (FIG. 13). The names of categories in each window associate data inputted or displayed in the windows below to the chosen category name shown in "Categories" editor window.

Input (i/p): Input variables to be typed by the user. The "Input" editor windows allow the user to manually enter data used for:

- information retrieval, diagnosis (as explained above).
- training with new data sets (manually inputted as explained above).

Fit: The "Fit" editor windows display the LAMSTAR interpolation/extrapolation of the input data or information retrieved. The diagnosis and retrieval processes are based on the input data entered by the user into "Input (I/p)" editor windows.

Final Output (o/p): The content of the "Final Output (o/p)" editor windows is selected from the "Fit editor window". By clicking on an appropriate "Keep/No" key, the content of the "Input (I/p)" editor window is copied to the "Final Output (o/p)" editor window.

Editor Labels: (Editor label "Categories" is shown on FIG. 13) The "Editor Labels" associate editor windows with: "Categories", "Input", "Output", "Result" as in FIG. 10. For example, all editors' windows in the same row as "Editor Label" —"Fit" display the interpolated/extrapolated data.

Command Keys

The user employs the "Command" keys (as shown in FIG. 14) to specify various tasks he or she wants the LAMSTAR system to carry out.

"Retrieve" key: (FIG. 14A) Starts the retrieval of information or the diagnosis phases in the LAMSTAR system. The user activates the "Retrieve" key every time he or she wants to find information correlated with the data shown in the "Input" editor windows. After the "Retrieve" key was activated, the retrieved information or diagnosis (for selected information) is shown automatically in the "Output" editor windows.

"Save/Train" key: (FIG. 14B) Saves the entered data or starts the training.

This command key is used for:
saving the data that were manually entered in the "Input" editors windows.

Besides the saving process, the LAMSTAR system automatically creates correlation links between newly entered data and the data entered earlier—the training phase, as explained in Section 4.1.

saving the data and creating correlation links among data that were automatically loaded using the "Open Training" option in the "File" pull-down menu (Section 4.1).

"New/Reset" key: (FIG. 14C) Resets content of all editor windows.

This command allows the user to enter a new data set for diagnosis or information retrieval.

"More" key: (FIG. 14D) (upper right corner of the LAMSTAR GUI as in FIG. 10).

Since the GUI displays information (categories/input/output/result) only for three categories at once (only three "Editors" windows in a row), by activating the "Forward/Backward" keys, the user can see information for more categories. For example, the LAMSTAR'S GUI initially shows input/output/result only for the first three (1 to 3) categories. When the "Forward (>)" key is activated, the information associated with next three categories (input and output) is displayed in the "Editor" windows (categories 4 to 6).

Another group of command keys are "Keep" keys (No) as shown in FIG. 14E. The "keep" keys control the content of the "Final Output (o/p)" editor window. If the "Keep" button in clicked, the content of the "Final Output (o/p)" editor window is identical to the input. If the "Keep" key is not clicked, the content of the "Final Output (o/p)" editor window is identical to the "Fit" editor window.

Case ID and Diagnosis editor windows

"Case ID" (FIG. 15) shows identification number for the analyzed case.

"Diagnosis" editor window (FIG. 16) shows the diagnosis produced by the LAMSTAR system. By clicking on "Keep" "y" or "n" (yes/no) buttons, the user indicates if the system diagnosis is accepted or not.

Categories Information Buttons

Figures 16, 17:
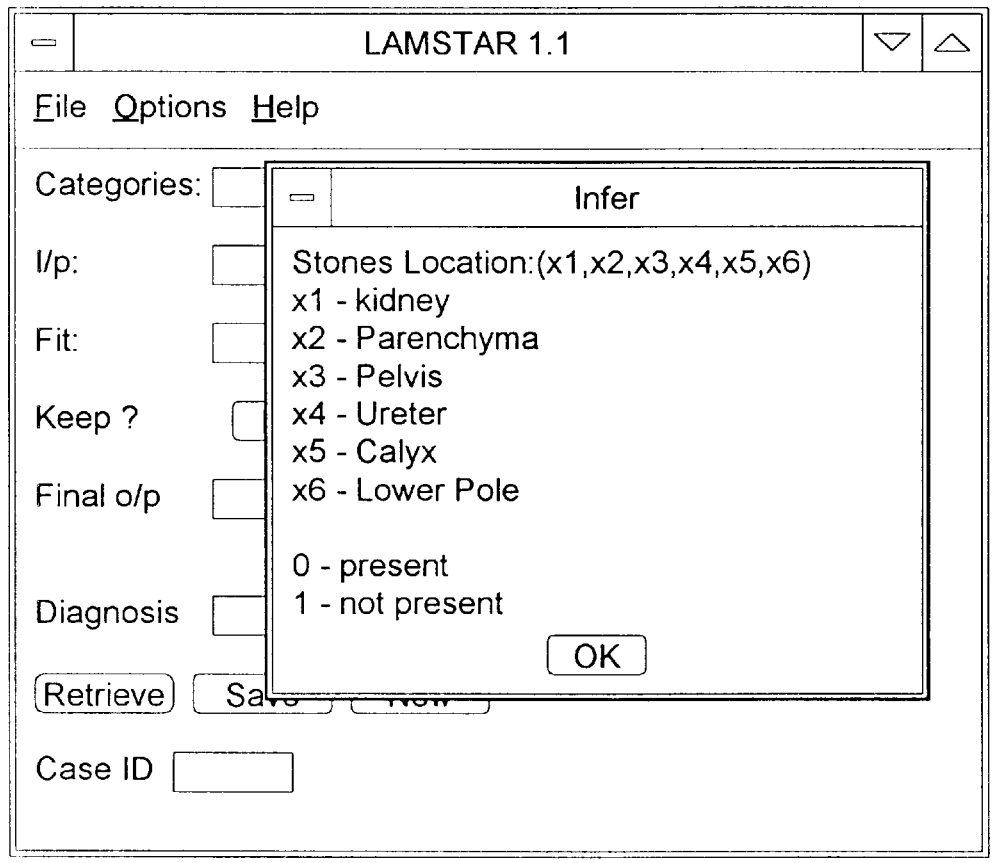

By clicking on the "?" button on the left side of the "Category" editor window, the system shows information about the variables used in this category. FIG. 17 shows the information window after the "?" button adjacent to the category "Location" was clicked.

Training the System with a New Data Set

When you start the LAMSTAR system, the Graphical User Interface of FIG. 10 appears on your screen. In order to use the LAMSTAR system for diagnosis, you need to provide it with data for the analyzed diagnosis problem. The LAMSTAR program allows the user to connect new data sets with the data already used for training/diagnosis, or to store the new data sets as a separate file for a new diagnosis problem. The data sets for the LAMSTAR training can be manually typed by the user or automatically read from a file. To train the system for a new diagnosis problem:

Create New Problem

From the "Options" pull-down menu, choose the "New Categories" option (FIG. 18). The program which creates new problems will appear as shown in FIG. 19. Choose option "n"—Create New Problem from the menu shown in FIG. 19.

Add Categories to a New or Existing Problem

From the "Options" pull-down menu, choose the "New Categories" option (FIG. 18). The program which creates new problems will appear as shown in FIG. 19. Choose option "a"—Add New Category.

Figure 21:
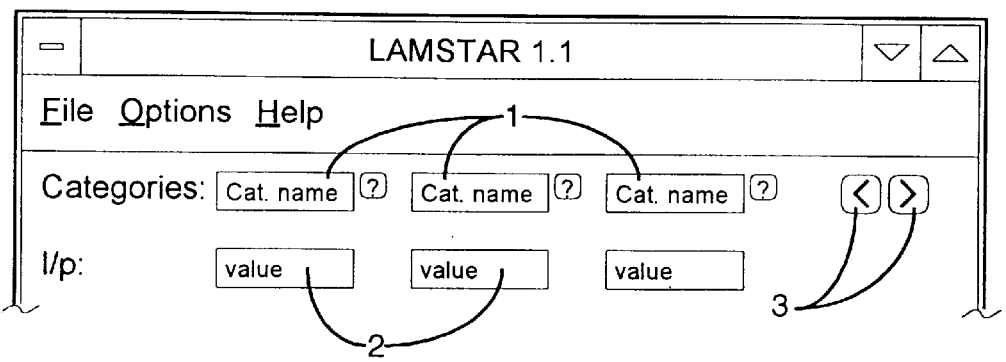

Manually entered data:
1. From the "File" pull-down menu, choose "Open Problem" option (2 in FIG. 20)
2. From the "File Selection" dialog box, choose the name of the created problem. The categories names will appear (1 in FIG. 21)
3. Write one data set in the "Input (i/p)" editors windows (2 in FIG. 21). Use the "Forward" key to show more categories (3 in FIG. 21).
4. Press the "Save" key at the bottom of the window of FIG. 10.
5. Repeat items 2 to 4 above for every set of the training data inputs as above.

Automatic training:

This option is used when diagnosis is based on existing data sets stored in the selected file, and where there is no need for manual data entry. The file can be a part of a database (patients' conditions data for the analyzed example), or be created with computer-based data acquisition tools.

1. From the "File" pull-down menu, choose "Open Problem" option (2 in FIG. 20).
2. From the "File Selection" dialog box (as shown in FIG. 20), choose the name of the created problem. The categories names will appear (1 in FIG. 21).
3. From the "File" pull-down menu of FIG. 10, choose the "Open Training" option (4 in FIG. 20). The "File Selection" dialog box appears (as in FIG. 22) with lists of files, directories, and drives.
4. Type the name of the file you want to open or select the file name by clicking on the name.
5. When the name of the file you want to open is displayed in the "File name" box (as in FIG. 22), choose the "OK" key. The system will load the data for a specific diagnosis problem.

The LAMSTAR system will store the data automatically in the specified file. The stored file contains all information needed for a new diagnosis problem. When the user wants to use the LAMSTAR for the diagnosis problem the system was trained to do using procedures described above, the stored file should be open by using the "Open Problem" option in the "File" pull-down menu.

To add new data sets to the existing (stored) data

This option is used when the user wants to extend the already existing links and stored information for a specific application with new data sets. The only difference between this option and the "To train the system for a new diagnosis problem" option, is that the user must first open file with the existing (stored) data using the "Open Problem" in the "File" pull-down menu (2 in FIG. 20).

To open a data file using the "Open Problem" option:
1. From the "File" pull-down menu (FIG. 10), choose the "Open Problem" option (2 in FIG. 20). The "File Selection" dialog box appears (as in FIG. 22) with lists of files, directories, and drives.

2. Type the name of the file you want to open or select the file name by clicking on the name as in FIG. 21. The selected file has the encoded information about a specified diagnosis problem.

3. When the name of the file you want to open is displayed in the selection box (FIG. 22), click the "OK" key. The system will load the data for a specific diagnosis problem.

This option is used when the user wants to use previously stored data for a specific diagnosis problem. The selected file provides categorie' names, previously stored information, and correlation links. Thus, the system makes a diagnosis that is based on data stored previously in the file selected by this option.

How to Enter the Data for Diagnosis

The main purpose of the LAMSTAR system is to find the best diagnosis (e.g. the patient's condition) given only a limited subset of information (input data). The user of the system should enter all available input data that describe the patient's condition.

To enter the data:

Manually:

1. From the "File" pull-down menu, choose the "Open Problem" option (2 in FIG. 20)

Figure 22:
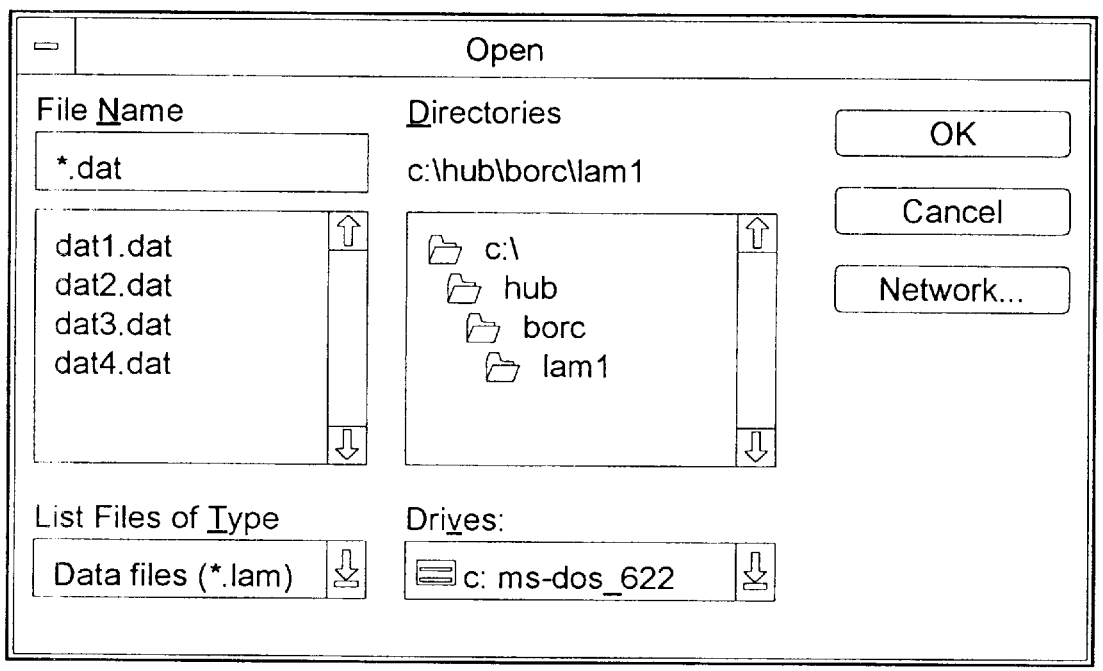

2. From the "File Selection" dialog box (as shown in FIG. 22), choose the name of the problem. The categories names will appear (1 in FIG. 21).

3. Write one data set in the "Input (I/p)" editors windows (2 in FIG. 21). Use the "Forward" key to show more categories (3 in FIG. 21).

Automatically:

1. From the "File" pull-down menu (of FIG. 10), choose "Open Diagnosis" (3 in FIG. 20). The "File Selection" dialog box appears (as in FIG. 21) with lists of files, directories, and drives.

2. Type the name of the file you want to open or select the file name by clicking on the name in the "File Name" box of FIG. 21.

3. When the name of the file you want to open is displayed in the "File name" box, click the "OK" key. The system will load the data for a specific diagnosis problem.

This option is used when diagnosis is based on data sets stored in the selected file, and there is no need for manual data entry. The file can be a part of a data-base (patient' conditions data for the analyzed example), or be created with computer-based data acquisition tools.

NOTE: In the simulation of the LAMSTAR system for the above medical diagnosis problem (as explained hereinafter), the program reads the data for training and testing (the testing mode is the same as normal diagnosis mode) from a file. Therefore, the testing (diagnosis) was done automatically without any manual data entry.

How to Retrieve Information

The LAMSTAR network applied to the medical diagnosis example attempts to give the best diagnosis of the patient's condition. In the diagnosis process, the LAMSTAR system uses all cases employed previously in the system training for a specific diagnosis problem (as explained above), as well as previous diagnosis sessions (the LAMSTAR system continuously update stored information through the internal punishment/reward feedback). The diagnosis is based on the input data (parameters describing patient's condition in the analyzed example) that are provided by the user.

Figure 23:
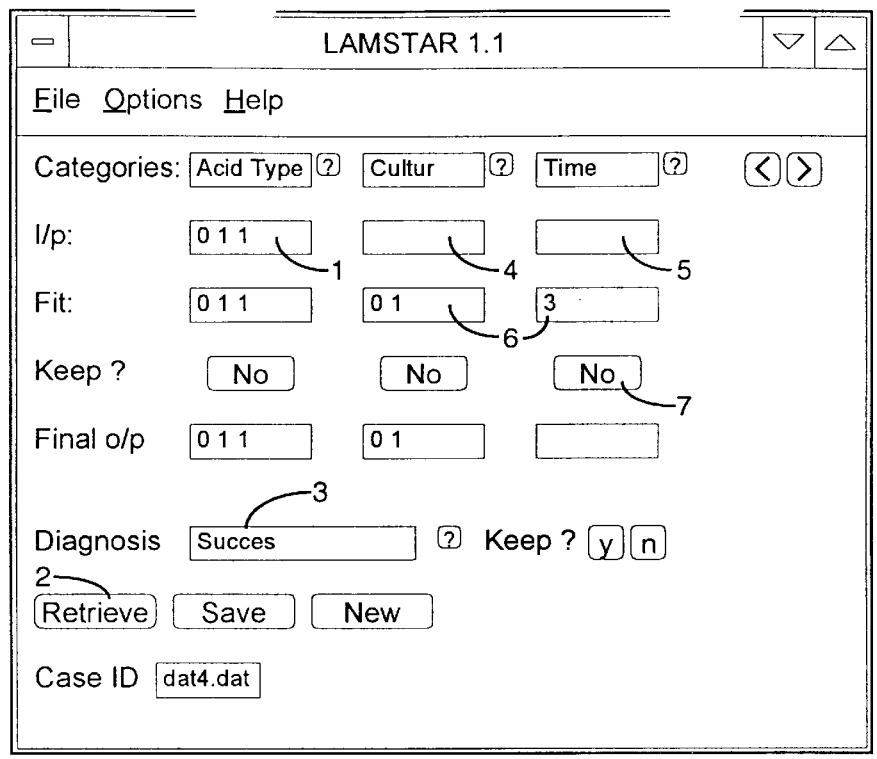
Figure 24:
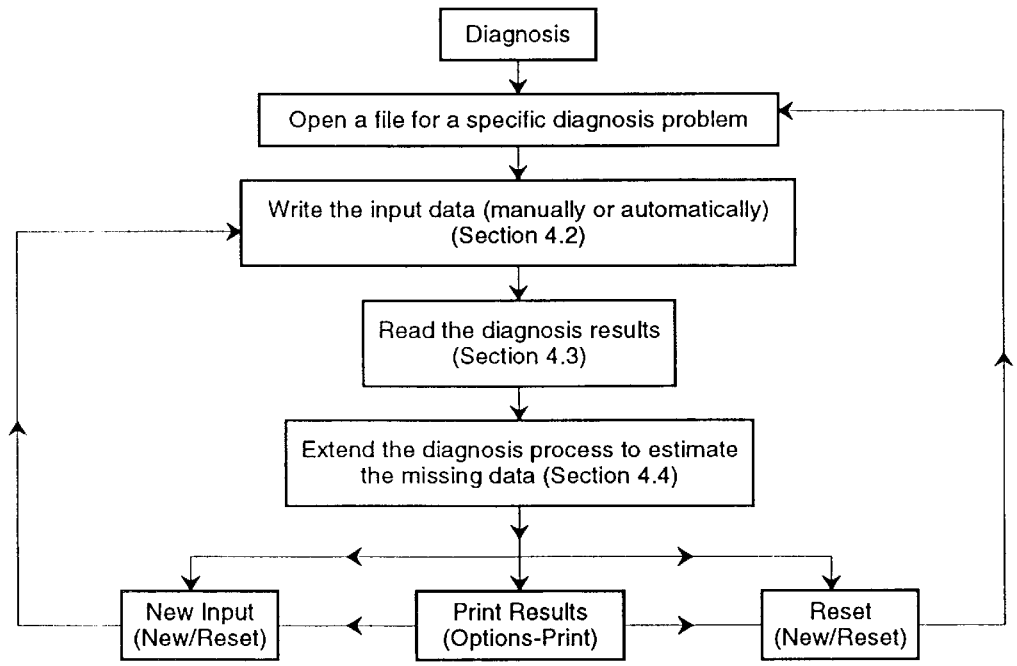
FIG. 24 shows a flow chart for diagnosis with the LAMSTAR system.

EXAMPLE: To find the diagnosis for the patient's condition after surgery:

1. After the data is entered into one or more "Input (i/p)" editor window, (1 in FIG. 23), (as explained above) press the "Retrieve" key (2 in FIG. 23).

2. Read the prediction in the "Output" editor window (3 in FIG. 23).

Extending the Diagnosis Process to Estimate the Missing Data

The LAMSTAR allows the user to extend the diagnosis process by interpolation/extrapolation of the missing data. The system can estimate missing data that are relevant to the input but were not available. This attribute is very helpful in cases where there is not enough input information. The LAMSTAR output shows not only the diagnosis result in the "Diagnosis" editor window (3 in FIG. 23), but also what parameters that describe the patient's condition (other than the ones used in the initial input data) are likely to occur "Fit" editor windows (4 in FIG. 23) show interpolated/extrapolated data). Thus, this option is a form of suggestion to perform a specific task to confirm the diagnosis.

For example, the LAMSTAR system gives not only the result of surgery (for the analyzed medical diagnosis problem the result is: success/failure (3 in FIG. 23)), but also result for categories not used for the diagnosis, "Kidney Location" (4 and 5 in FIG. 23) and "Culture" both categories were not used for diagnosis, namely, they were not provided as parts of the input—empty "Input (i/p") editor windows).

To extend the process of estimating missing data:

1. Press the "Retrieve" button (2 in FIG. 23) to see the diagnosis results (3 in FIG. 23). The "Fit" editor windows (6 in FIG. 23) automatically shows the interpolation/extrapolation of the input (i/p) data.

2. The "Final Output (o/p)" editor windows also show the interpolated/extrapolated data.

3. If the user prefers input data to be processed to the "Final output (o/t)" editor windows, by clicking on the "no" keys (7 in FIG. 23), the input data is processed to the "Final output (o/p)" editor windows.

This attribute is also very useful in cases of medical diagnosis, and also in cases of fault diagnosis, say, diagnosis of fault in an automobile repair problem. Given only fuel, and electrical system parameters, the system tells you not only what is wrong (diagnosis) in the fuel and electrical system on the basis of the parameters, but also what is wrong in other parts of the automobile (such as transmission and engine) that are somehow correlated with the parts for which you entered data (fuel and electrical systems).

Step by Step Diagnosis Demo

The "Step by Step Diagnosis Demo" is a brief introduction to the features and procedures for executing diagnosis tasks with the LAMSTAR system. This section will help the user to learn how to use the LAMSTAR system by seeing the program in action. Although, the diagnosis example presented below is based on a specific medical diagnosis problem described in Section 2, the user should be able to employ the same processing steps for any diagnosis application.

Diagnosis:

1. Load the file for the diagnosis problem at hand (as explained above).

From the "File" pull-down menu, choose the "Open Problem" option.

When the "File Selection" dialog box appears (as in FIG. 25), choose file with data for the diagnosis problem.

Figure 25:
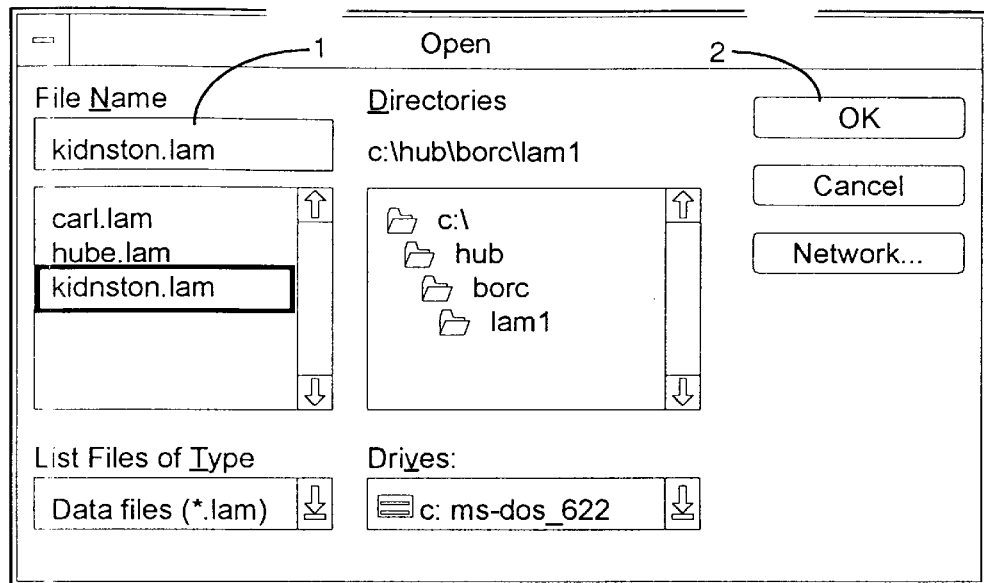
FIG. 25 shows the "File Selection" dialog box with an example.

In this demonstration, the selected file is the file stored in the training example above, namely, "kidston.dat" (1 in FIG. 25).

2. Write the input data.

Figure 26:
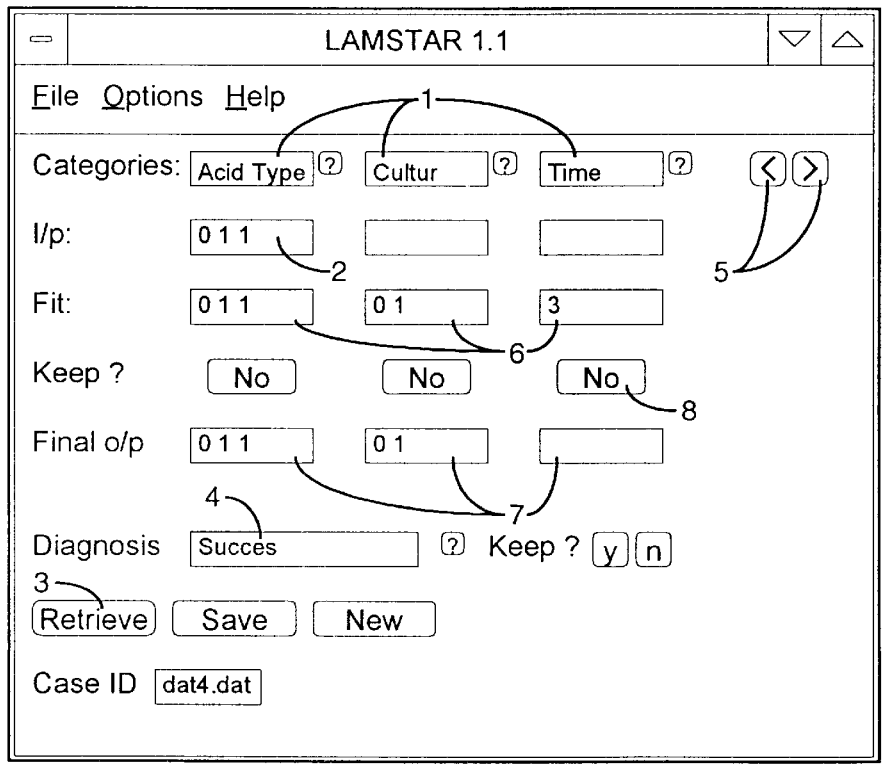
FIG. 26 shows the display for a successful diagnosis.

The categorie' names appear in the "Categories" editors windows (1 in FIG. 26).

Type the data available for the diagnosis into "Input" editors windows (2 in FIG. 26).

3. Read the diagnosis results.

Press the "Retrieve" key (3 in FIG. 26).

Read the diagnosis results from the "Diagnosis" window (4 in FIG. 26).

If necessary, use the "Forward/Backward" keys to display output for other categories (5 in FIG. 26).

Interpolation/Extrapolation of the Missing Data

After the user clicked the "Retrieve" button (3 in FIG. 26) to see the diagnosis results, the "Fit" editor windows (6 in FIG. 26) automatically shows the interpolation/extrapolation of the input (I/p) data.

The "Final output (o/p)" editor windows also show the interpolated/extrapolated data (7 in FIG. 26).

If the user prefers input data to be processed to the "Final output (o/t)" editor windows, by clicking on the "No" keys (8 in FIG. 22 for "Stone Culture" category), the input data is processed to the "Final output (o/p)" editor windows.

For example, the input values for the "Kidney Location" and the "Stones Culture" categories were not specified, namely, the user did not enter the input values for these categories. The system predicted the values for the above categories. Now, the user decides to:

perform additional tests to determine if the values predicted by the LAMSTAR system are correct.

accept the predicted values.

Save the Updated Links and Categories Values

The file used for the diagnosis problem should be saved (using the "Save" option in the "File" pull-down menu), since the LAMSTAR system updates its "medical knowledge" after every diagnosis (through the internal punishment/reward feedback).

Creation of a New Problem and Categories

Figure 27:
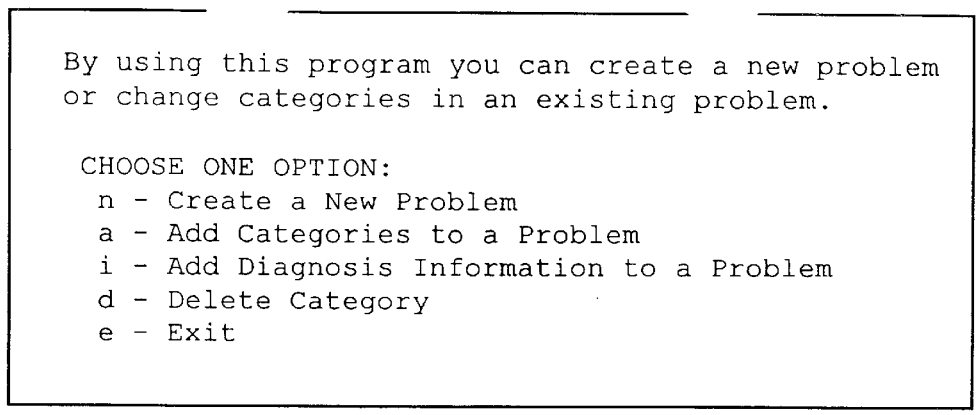
FIG. 27 shows the front panel of a program started by the new categories option.

The option "New Categories" in the "Options" pull-down menu starts a program (as shown in FIG. 27) that allows the user to create a new problem, add category to an existing problem, delete a category, and add diagnosis information. The program operation is dialog based, so that the user answers simple questions, such as names of the new problem or category, etc. The program automatically stores the given information.

Create a New Problem:

By choosing this option, the user can create a new diagnosis problem to be used with the LAMSTAR. After the user types the name of the new diagnosis problem, the program automatically creates all files needed to perform diagnosis. For example, if the name of a new problem is "Diagnosis", the program creates the file diag.lam.

Add Categories to a Problem:

By choosing this option, the user can add categories to an existing problem or to anew problem created by the "Create a New Problem" option.

With creation of a new category, the program prompts the user to provide the following information:

name of the category the number of elements in the category information about is element in the category. This information is shown whenever the user uses the "?" button associated with the category.

Add Diagnosis Information:

By choosing this option, the user can add diagnosis information to an existing problem or to a new problem created by the "Create a New Problem" option.

The program prompts the user to provide the following information:

diagnosis results. For example: "success" "failure") as in the medical diagnosis problem discussed in Section 1.2.

diagnosis information. This information is shown whenever the user uses the "?" button adjacent to the diagnosis window. For example: "Kidney stones will not reoccur" as in the medical diagnosis problem.

Delete Category:

By choosing this option, the user can delete a category from an existing problem or to a new problem created by "Create a New Problem" option.

What is claimed is:

1. A network system for processing an input word comprising an associated set of subword category subwords, the input word being an input observation of a monitored system as of a specific time period, said system comprising:

means for storing the input word;

a SOM subsystem comprising a plurality of self-organizing map modules (SOM), each said SOM module comprising a plurality of memory cells for selectively storing, as stored subwords, the category subwords of the input word, said system further comprising:

means for comparing and correlating said category subwords of the input word to determine a winning match between one of the subwords of the input word and a finite predetermined number of the memory cells for subwords stored within said SOM modules;

means for choosing a selected one of the memory cells in a selected one of said SOM modules responsive to said winning match;

a plurality of sets of subword category correlating links and of SOM memory cell correlating links, each said correlating link comprising a memory cell link weight value for linking respective associated ones of selected ones of the memory cells between respective associated selected ones of the SOM modules;

a task evaluator subsystem comprised of means for establishing threshold values for said correlating links;

said system further comprising:

means for adjusting said memory cell link weight values responsive to the input subwords and to the SOM memory cells, said memory cell link weight values being increased upon said winning match, said memory cell link weight values being decreased when no said winning match is established; and means for storing a subword in one of the SOM memory cells when no winning match is determined after a predetermined number of memory cells in the SOM modules are compared.

2. The system of claim 1, wherein said means for adjusting memory cell link weight values comprises means for counting repetitions of comparing and correlating respective ones of said category subwords of the input word.

3. The system of claim 2, wherein said task evaluator subsystem comprises said means for adjusting the memory cell link weight values.

4. The system of claim 2, further comprising means for clearing a memory cell having a predetermined memory cell link weight value.

5. The system of claim 4, wherein said memory cell link weight value is approximately zero.

6. The system of claim 1, wherein said SOM subsystem further comprises means for storing a subword in one of said memory cells when a winning match is determined.

7. The system of claim 6, wherein the stored subword comprises a diagnostic decision.

8. The system of claim 6, wherein said stored subword comprises an output decision.

9. The system of claim 1, wherein said task evaluator subsystem further comprises means to overrule said output decision.

10. The system as in claim 1, further comprising stochastic modulator means, responsive to said task evaluator, for pseudo-randomly modulating selected ones of said link weight values.

11. The system as in claim 1, further comprising means for initializing said correlative links.

12. The system as in claim 10, wherein substantially all said correlative link weight values are first initialized at a pseudo-random value.

13. The system as in claim 1, wherein, responsive to thresholds set by the task evaluator means, and beginning with highest link weight values, said input subwords are correlated with the stored subwords in the SOM modules in accordance with the correlative links and the input subwords.

14. The system as in claim 1, wherein said link weight values are adjusted based on the frequency of occurrence of particular input subwords.

15. The system as in claim 1, further comprising at least two sets of correlative links per subword category, wherein at least one said set comprises correlative links for interconnecting memory cells within said SOM modules, and at least another said set comprises correlative links for interconnecting said plurality of memory cells from one said SOM module to another said SOM modules.

16. The system as in claim 1, wherein a given said link weight decays after a predetermined successive number of input words have been processed and no said winning match is determined over said link.

17. The system as in claim 1, wherein said link weight values further comprises a plurality of correlative link weight classifying dimensions, wherein one said dimension is time, wherein said time is counted as a succession of provided input words.

18. The system as in claim 1, further comprising means for determining elapsed processing time and said task evaluator further comprises means for interrupting the processing based on elapsed processing time.

19. The system of claim 1, wherein at least one said SOM category is selected from the group comprising medical diagnostic data, literature searching data, legal research data, avionics fault diagnostic data, internal combustion engine diagnostic data, atomic energy generating system fault analysis data, automatic test data, criminal investigation, telecommunications data, and electronic switching data.

20. The system of claim 1, further comprising user means for entering additional subword categories to said network system.

21. The system of claim 1, further comprising means for connecting an input subword to a SOM memory cell in accordance with the correlative highest link weight value of said input subword.

22. The system of claim 1, further comprising means for connecting a SOM memory cell in a SOM module to another SOM memory cell in another SOM module in accordance with the highest correlative link weight value of a selected memory cell.

23. A learning network system for providing a diagnostic result output responsive to an input word comprised of a plurality of input subwords, said system comprising:

control apparatus for determining link weight values for each of the input subwords;

correlative link memory for selectively storing and outputting the link weight value for a plurality of subword categories, one said value corresponding to each said subword category, wherein each of the plurality of input subwords is assigned to one of the plurality of subword categories, said correlative link memory further comprising initialization link correlative memory, vertical link correlative memory, and horizontal link correlative memory;

SOM memory comprising a plurality of self-organizing map modules (SOM), each said module comprising a plurality of memory cells, each said module providing for storing a plurality of the input subwords associated with a single one of the assigned subword categories;

means for processing the input word responsive to the initialization link correlative memory to select a respective one of the input subwords as a selected subword to be processed, wherein the selected input subword is coupled for correlation to a corresponding selected one of the SOM modules; and means for correlating the selected subword to at least one of a predefined plurality of the memory cells of the selected one of the SOM modules responsive to the correlative link memory to provide a result output:

wherein the control apparatus is responsive to the result output to modify the respective link weight values as stored in the correlative link memory to provide learning and forgetting.

24. The system as in claim 23, further comprising means for selection of a next one of the SOM modules for correlation against a respective next one of the input subwords responsive to correlation of the selected one of the predefined plurality of memory cells against a respective one of the horizontal memory link weight values.

25. The system of claim 23, further comprising a stochastic modulator for providing outputs for adjusting the correlative link weight values assigned to respective ones of the correlative link memory, as associated with the correlated ones of the memory cells.

26. The system of claim 24, further comprising next input word selection means, whereby after processing all categories of input subwords, said selection means selects the next input word to the system for processing.

27. The system as in claim 23, further comprising:

a task evaluator subsystem;

wherein the correlation is responsive to the task evaluator system for selection of the input subwords, the SOM modules, and the memory cells, responsive to analyzing the correlative link weight values.

28. A neural network system for providing an output decision to a user, said system responsive to an input word, said input word comprising a plurality of input subwords, each said input subword having an associated subword category, said neural network system comprising:
- apparatus for initially determining a link weight value for each subword category;
- a correlative link memory for selectively storing and outputting the link weight values for each of the subword categories of the input word, said correlative link memory comprising initialization link memory, vertical link memory, and horizontal link memory;
- a plurality of self-organizing map modules (SOM), wherein each of the SOM modules is comprised of a plurality of memory cells, each of said SOM modules providing for storage of input subwords relating to a common one of the subword categories, wherein there is a SOM module for each of the plurality of input subword categories, wherein each of the plurality of SOM modules communicates with the correlative link memory;
- means for selecting a particular one of the input subwords for processing responsive to correlating the input subwords against the link weight values stored in the initialization link memory;
- means for selecting a particular one of the SOM modules responsive to correlating the particular one of the input subwords against the link weight values in the vertical link memory;
- means for selecting a particular one of the memory cells within the particular one of the SOM modules responsive to correlating the particular one of the input subwords against the link weight values stored in the horizontal link memory; and
- adjustment means for modifying the link weight values stored in the correlative link memory responsive to learning and forgetting based on the correlating of the input subwords against the correlative link memory.

29. The neural network of claim 28, further comprising a task evaluator subsystem comprising means for establishing associated initialization, vertical and horizontal link thresholds for each of said respective initialization, vertical, and horizontal link memories;
wherein said means for selecting is responsive to said correlation in accordance with the respective thresholds.

30. The neural network system of claim 28, further comprising stochastic modulation means for providing an pseudo-random adjustment signal for said system, wherein the correlative link memory is responsive to the adjustment signal to adjust at least one of the link weight values.

31. The neural network system of claim 30, wherein said adjustment signal has an output level, wherein said task evaluator further comprises means for providing a gain control signal output, wherein the stochastic modulation means is responsive to the gain control signal output to provide for adjusting the output levels.

32. The neural network system of claim 28, further comprising means for assigning a predetermined processing priority flag for each of said subwords, wherein said priority flag is utilized to alter the link weight values in the initialization link memory.

33. The neural network system of claim 32, wherein said priority flag is utilized to provide an alert to a system user, wherein said priority flag is chosen from a priority action list comprising danger and threat to life.

34. The neural network system of claim 28, wherein the adjustment means provides for selective adjustment of the link weight values responsive to user feedback.

35. The neural network system of claim 28, wherein the adjustment means provides for adjusting at least one of said link weight values by varying said link weight values in accordance with predefined success and failure parameters, responsive to said correlation of the input subwords to the SOM memory cells.

36. The neural network system of claim 28 further comprising a plurality of predetermined forgetting curves, wherein the adjustment means selectively decreases respective ones of said subword category link weight values to decrease the link weight values in accordance with at least one said forgetting curve.

37. The neural network system of claim 28, further comprising a plurality of learning curves, wherein said subword category link weight values are adjusted by said adjustment means to increase the link weight values in accordance with said learning curves.

38. The system of claim 28, wherein said means for comparing and correlating the input word to the subword category to determine a winning match is comprised of means for determining the Hamming distance between compared subwords.

39. The system of claim 38, there are N bits in each said subword, and M represents the match between selected compared subwords, wherein the means for determining the Hamming distance determines the Hamming distances between said selected compared subwords $$\frac{N-M}{N}.$$

40. The system of claim 29, wherein said task evaluator means comprises means for ordering additional ones of the input subwords to be processed by said system.

41. The system of claim 28, further comprising output means for outputting and displaying at least one winning cell in at least one SOM module to a user.

42. The system as in claim 28, wherein a plurality of the link weight values comprise an index for linking between said SOM modules.

43. The system as in claim 42, wherein the link weight values for a respective correlative link are increased by said adjustment means when a winning match occurs for said respective correlative link.

44. The system as in claim 43, wherein the winning match is provided responsive to the respective stored subword correlating to within a predefined distance function value of the corresponding respective input subword.

45. The system as in claim 28, wherein the link weight values are decreased by the adjustment means for a respective correlative link, when for a predetermined number of successive ones of the input words, the respective correlative link does not correspond to winning matches.

46. The system as in claim 45, wherein the amount by which the correlative link weight values are decreased is determined in accordance with a predefined forgetting curve.

47. The system as in claim 46, wherein there are a plurality of different ones of the predefined forgetting curves of which only one is active and utilized at any one time, the system further comprising means for selectively varying which one of the predefined forgetting curves is active.

48. The system as in claim 28, wherein at least one said SOM category is selected from a group comprising medical diagnostic data, literature searching data, legal research data, avionics fault diagnostic data, internal combustion engine diagnostic data, atomic energy generating system fault analysis data, automatic test data, criminal investigation data, telecommunications data, and electronic switching data.

49. A neural network system for providing an output decision to a user, said system responsive to an input word, said input word comprising a plurality of input subwords, each said input subword having an associated subword category, said neural network system comprising:
- a correlative link memory for storing and selectively outputting correlative link weights for each of the subword categories of the input word, said correlative link memory comprising vertical link memory, and horizontal link memory;
- a task evaluator subsystem comprising means for establishing associated vertical and horizontal link thresholds for each of said respective vertical and horizontal link memories;
- SOM memory comprising a plurality of self-organizing map modules (SOM), wherein each of the SOM modules is comprised of a plurality of memory cells, each of said SOM modules providing for storage of input subwords relating to a common one of the subword categories, wherein there is a SOM module for each of the plurality of input subword categories, wherein each of the plurality of SOM modules is associated with a respective portion of the correlative link memory;
- means for selecting a particular one of the SOM modules responsive to correlating a selected one of the input subwords with said respective portion of the vertical link memory in accordance with said vertical link thresholds; and
- means for selecting a particular one of the memory cells within the particular one of the SOM modules responsive to correlating the selected one of the input subwords with said respective portion of the horizontal link memory in accordance with said horizontal link thresholds.

50. The neural network system as in claim 49, wherein said task evaluator provides for adjustment of said link weights by varying said link weights in accordance with predefined success and failure parameters, responsive to said correlation with the correlating link memory.

51. The neural network system as in claim 49, further comprising a user feedback signal, wherein said user feedback signal is utilized by said system to establish said link thresholds.

52. The neural network system as in claim 49, further comprising:
- stochastic modulation means providing for pseudo-random adjustments of said link weights stored in said correlative link memory, and wherein the stochastic modulation means is initialized and controlled responsive to said task evaluator.

53. The neural network as in claim 49, wherein at least one said SOM category is selected from the group comprising medical diagnostic data, literature searching data, legal research data, avionics fault diagnostic data, internal combustion engine diagnostic data, atomic energy generating system fault analysis data, automatic test data, criminal investigation data, telecommunications data, and electronic switching data.

54. A system to determine a result output responsive to processing an input word comprising a plurality of input subwords each having a respective associate subword category, the system comprising:
- SOM memory comprising a plurality of SOM modules each comprised of a plurality of memory cells, for selectively storing and outputting indexed knowledge data;
- correlative link memory providing for selective storage and output of link weight values for each of the subword categories, comprising:
    - vertical link memory providing for storage and output of the link weight values for each of the subword categories for selection of a respective one of the SOM modules;
    - horizontal link weight memory for storage and output of the link weight values for each of the subword categories for selection of selected ones of the memory cells within the respective one of the SOM modules;
- first selection apparatus for selecting one of the input subwords as a selected subword;
- a second selection apparatus, responsive to the selected subword and the correlative link memory, for selecting a particular one of the SOM modules responsive to the correlation of the vertical link weight values to the selected subword;
- third selection apparatus for selecting at least a particular one of the memory cells for correlation within the particular one of the SOM modules against the selected subword, responsive to the selected subword and the horizontal link memory;
- result output apparatus for providing success and failure feedback responsive to the correlations of the second and third selection apparatus; and
- adjustment apparatus for selectively increasing and decreasing respective ones of the link weight values as stored in the correlative memory, responsive to the success and failure feedback.

55. The system as in claim 54, further comprising;
- initialization link memory providing for storage and output of the link weight values for selection of an order of processing for said input subwords;
- wherein the first selection means is responsive to the initialization link memory to provide for selection of one of the input subwords as the selected subword.

* * * * *